US012798192B2

(12) United States Patent
Muranaka et al.

(10) Patent No.: US 12,798,192 B2
(45) Date of Patent: Nov. 17, 2026

(54) ADDITIVE MANUFACTURING APPARATUS AND METHOD OF MANUFACTURING THREE-DIMENSIONAL OBJECT

(71) Applicant: Sodick Co., Ltd., Kanagawa (JP)

(72) Inventors: Katsutaka Muranaka, Kanagawa (JP); Yoshitaka Kato, Kanagawa (JP); Kenji Ishibashi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 7 days.

(21) Appl. No.: 18/491,795

(22) Filed: Oct. 22, 2023

(65) Prior Publication Data

US 2024/0149530 A1 May 9, 2024

(30) Foreign Application Priority Data

Nov. 7, 2022 (JP) ................................ 2022-177873

(51) Int. Cl.
*B29C 64/371* (2017.01)
*B22F 10/322* (2021.01)
(Continued)

(52) U.S. Cl.
CPC .......... *B29C 64/371* (2017.08); *B22F 10/322* (2021.01); *B29C 64/25* (2017.08);
(Continued)

(58) Field of Classification Search
CPC ......... B01D 46/10; B01D 46/71; B22F 10/28; B22F 10/322; B22F 10/77; B22F 12/45; B22F 12/70; B22F 12/90; B29C 64/153; B29C 64/25; B29C 64/268; B29C 64/364; B29C 64/371; B29C 64/393; B33Y 10/00;
(Continued)

(56) References Cited

U.S. PATENT DOCUMENTS 11,717,890 B2 8/2023 Muranaka
2012/0126457 A1 5/2012 Abe et al.
(Continued)

FOREIGN PATENT DOCUMENTS

JP 2003220313 8/2003
JP 2008142580 6/2008
(Continued)

*Primary Examiner* — Philip C Tucker
*Assistant Examiner* — Jimmy R Smith, Jr.
(74) *Attorney, Agent, or Firm* — JCIPRNET

(57) ABSTRACT

An additive manufacturing apparatus and a method of manufacturing three-dimensional object are provided. According to the disclosure, the additive manufacturing apparatus includes a chamber, an inert gas supply apparatus, a fume collector, a pressure detection apparatus, and a control apparatus. The chamber covers a building region where a desired three-dimensional object is formed. The inert gas supply apparatus supplies an inert gas to the chamber. The fume collector includes a blower and removes fumes from the inert gas that is exhausted together with the fumes from the chamber. The blower circulates the inert gas between the chamber and the fume collector by operating at a predetermined rotation speed. The pressure detection apparatus detects a pressure in the chamber. The control apparatus controls the fume collector to switch a rotation speed of the blower based on the pressure.

9 Claims, 11 Drawing Sheets

(51) Int. Cl.

| | |
|---|---|
| ***B29C 64/25*** | (2017.01) |
| ***B29C 64/268*** | (2017.01) |
| ***B33Y 10/00*** | (2015.01) |
| ***B33Y 30/00*** | (2015.01) |

(52) U.S. Cl.
CPC ............. *B29C 64/268* (2017.08); *B33Y 10/00* (2014.12); *B33Y 30/00* (2014.12)

(58) Field of Classification Search
CPC ......... B33Y 30/00; B33Y 40/00; B33Y 50/02; Y02P 10/25
See application file for complete search history.

(56) References Cited

U.S. PATENT DOCUMENTS

| | | | | |
|---|---|---|---|---|
| 2012/0137890 | A1* | 6/2012 | Koyama | B01D 46/2407 96/233 |
| 2018/0244034 | A1 | 8/2018 | Sutcliffe et al. | |
| 2020/0061655 | A1* | 2/2020 | Wakelam | B29C 64/153 |
| 2020/0269176 | A1* | 8/2020 | Shinoda | B01D 45/12 |
| 2021/0001557 | A1* | 1/2021 | Amaya | B29C 64/371 |

FOREIGN PATENT DOCUMENTS

| | | |
|---|---|---|
| JP | 2010265521 | 11/2010 |
| JP | 2017538038 | 12/2017 |
| JP | 2019007640 | 1/2019 |
| JP | 2019018130 | 2/2019 |
| JP | 6653909 | 2/2020 |
| JP | 2021008661 | 1/2021 |
| JP | 7104223 | 7/2022 |

* cited by examiner

ADDITIVE MANUFACTURING APPARATUS AND METHOD OF MANUFACTURING THREE-DIMENSIONAL OBJECT

CROSS-REFERENCE TO RELATED APPLICATION

This application claims the priority benefits of Japanese application no. 2022-177873, filed on Nov. 7, 2022. The entirety of the above-mentioned patent application is hereby incorporated by reference herein and made a part of this specification.

BACKGROUND

Technical Field

The disclosure relates to an additive manufacturing apparatus and a method of manufacturing a three-dimensional object. In particular, it relates to the stability of the building quality by an apparatus and method for removing fumes from inert gas exhausted from a chamber in the manufacturing of three-dimensional objects where a large amount of fumes are generated when forming one solidified layer.

Related Art

Various methods are known for the additive manufacturing of three-dimensional objects. For example, a material layer is formed by supplying metal material powder to a building region in a chamber filled with inert gas, and a solidified layer is formed by sintering or melting the material layer by irradiating an energy beam, such as laser light or an electron beam, at a predetermined position on the material layer. By repeating the formation of the material layer and the solidified layer, multiple solidified layers are laminated to manufacture the desired three-dimensional object.

To prevent deterioration of the material powder, the chamber is filled with inert gas. Also, when an energy beam is irradiated, smoke called fumes is generated from the irradiation position. Fumes may potentially affect the building quality by attenuating the energy beam or contaminating optical components. Thus, when new inert gas is supplied to the chamber, the inert gas containing fumes is exhausted from the chamber, and clean inert gas from which fumes have been removed by a fume collector is returned to the chamber.

In order to manufacture a built object with high quality and stability, it is necessary to promptly and efficiently exhaust fumes from the chamber. In the additive manufacturing apparatus of Patent Literature 1, a gas supply part that supplies inert gas to the chamber includes upper, middle, and lower nozzles, and by forming an airflow of inert gas from the front side of the chamber toward the back side, it is possible to prevent the fumes from accumulating and efficiently exhaust fumes.

CITATION LIST

Patent Literature

[Patent Literature 1] Patent No. JP 7104223

A known dust collector such as a filtration type dust collector or a dry type electric dust collector is used as a fume collector, and a blower for circulating an inert gas between the chamber and the dust collector is provided. When such a fume collector is operated and building is started, the circulating air volume between the fume collector and the chamber may gradually decrease. This is because fumes adhere to the filter or filter-like components provided in the dust collector and clogging occurs. For example, a filter for collecting fumes is provided in a filtration type dust collector, and a filter-like catalyst unit to capture ozone generated by application of high voltage is provided in a dry type electric dust collector. When the circulating air volume decreases, the efficiency of fume exhaust may decrease, which may affect the building quality.

This disclosure has been made in view of such circumstances, and aims to provide an additive manufacturing apparatus that can suppress a decrease in circulating air volume between the fume collector and the chamber in order to maintain the pressure in the chamber constant, and efficiently exhaust fumes from the chamber.

SUMMARY

An additive manufacturing apparatus that includes a chamber, an inert gas supply apparatus, a fume collector, a pressure detection apparatus, and a control apparatus is provided. The chamber covers a building region where a desired three-dimensional object is formed. The inert gas supply apparatus supplies an inert gas to the chamber. The fume collector includes a blower and removes fumes from the inert gas that is exhausted together with the fumes from the chamber. The blower circulates the inert gas between the chamber and the fume collector by operating at a predetermined rotation speed. The pressure detection apparatus detects a pressure in the chamber. The control apparatus controls the fume collector to switch a rotation speed of the blower based on the pressure.

A method of manufacturing three-dimensional object is provided. A desired three-dimensional object is formed by at least covering a building region where the desired three-dimensional object is formed with a chamber and supplying an inert gas to the chamber, while exhausting the inert gas containing fumes from the chamber and removing the fumes contained in the inert gas exhausted from the chamber by a fume collector. The fume collector includes a blower that circulates the inert gas between the chamber and the fume collector by operating at a predetermined rotation speed. The method includes: a solidified layer forming process of laminating a solidified layer by repeating a material layer forming process of forming a material layer by supplying a material powder to the building region and a solidifying process of forming the solidified layer by irradiating the material layer with an energy beam, and a fume removal process of switching the rotation speed of the blower of the fume collector based on a pressure in the chamber.

DESCRIPTION OF THE EMBODIMENTS

Figure 1:
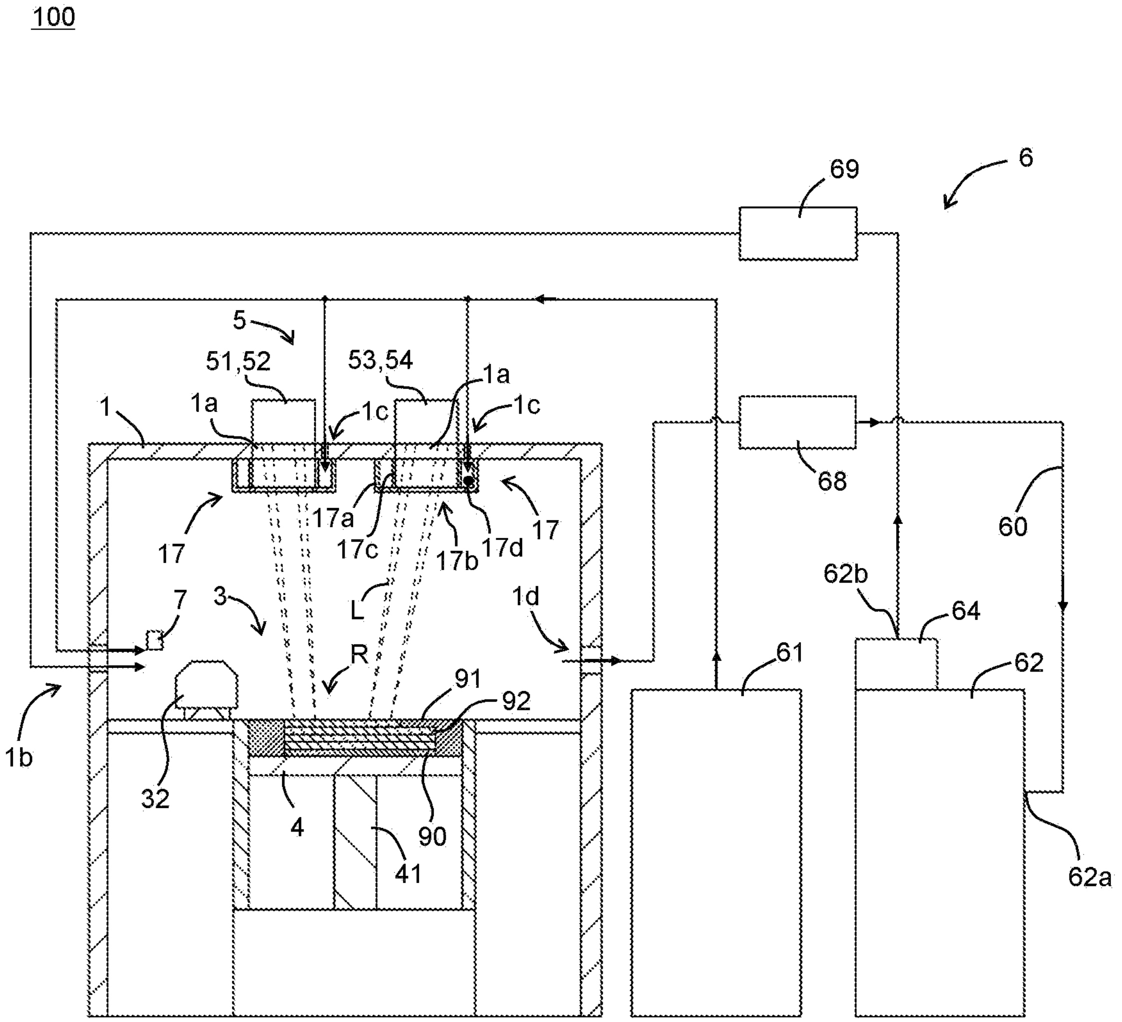
FIG. 1 is a schematic configuration diagram of an additive manufacturing apparatus 100 according to an embodiment of the disclosure.

According to this disclosure, the following are provided.

[1] An additive manufacturing apparatus that includes a chamber, an inert gas supply apparatus, a fume collector, a pressure detection apparatus, and a control apparatus is provided. The chamber covers a building region where a desired three-dimensional object is formed. The inert gas supply apparatus supplies an inert gas to the chamber. The fume collector includes a blower and removes fumes from the inert gas that is exhausted together with the fumes from the chamber. The blower circulates the inert gas between the chamber and the fume collector by operating at a predetermined rotation speed. The pressure detection apparatus detects a pressure in the chamber. The control apparatus controls the fume collector to switch a rotation speed of the blower based on the pressure.

[2] The additive manufacturing apparatus according to [1] is provided. The fume collector further includes a filter and a backwash apparatus. The filter is configured to be capable of capturing the fumes from the inert gas that is exhausted together with the fumes from the chamber and that passes through the filter in a predetermined inflow direction. The backwash apparatus is configured to perform backwash by blowing the inert gas in a direction opposite to the inflow direction onto the filter.

[3] The additive manufacturing apparatus according to [2] is provided. The fume collector is configured to include a fume removal mode and a backwash mode as operating modes. In the fume removal mode, the blower is operated to remove the fumes from the inert gas by the filter. In the backwash mode, the blower is stopped and the backwash is performed by the backwash apparatus. The control apparatus includes a mode switching part. The mode switching part switches the operating modes. The control apparatus controls the fume collector in fume removal mode so as to switch the rotation speed of the blower based on the pressure.

[4] The additive manufacturing apparatus according to [3] that includes a material layer forming apparatus and an irradiation apparatus is provided. The material layer forming apparatus forms a material layer by supplying a material powder to the building region. The irradiation apparatus forms a solidified layer by irradiating the material layer with an energy beam. The mode switching part switches the operating modes such that an operation of the fume collector in the backwash mode is performed during formation of the material layer.

[5] The additive manufacturing apparatus according to [3] or [4] is provided. The control apparatus includes a mode continuation time setting part. The mode continuation time setting part sets a removal continuation time, which is a time per one operation of the fume collector in the fume removal mode. The mode switching part switches from the fume removal mode to the backwash mode based on the removal continuation time.

[6] The additive manufacturing apparatus according to [5] is provided. The mode continuation time setting part sets a first backwash continuation time and a second backwash continuation time, which is longer than the first backwash continuation time, as a backwash continuation time per one operation of the fume collector in the backwash mode. The mode switching part switches from the backwash mode to the fume removal mode based on the backwash continuation time. The first backwash continuation time is the backwash continuation time in an immediately subsequent operation of the fume collector in the backwash mode in a case where the pressure falls within a predetermined allowable range by the control apparatus controlling the fume collector of the fume removal mode. The second backwash continuation time is the backwash continuation time in an immediately subsequent operation of the fume collector in the backwash mode in a case where the pressure falls below the allowable range, even if the rotation speed of the blower reaches a predetermined upper limit by the control apparatus controlling the fume collector of the fume removal mode.

[7] The additive manufacturing apparatus according to [5] or [6] is provided. The mode continuation time setting part sets a first backwash continuation time and a third backwash continuation time, which is longer than the first backwash continuation time, as a backwash continuation time per one operation of the fume collector in the backwash mode. The mode switching part switches from the backwash mode to the fume removal mode based on the backwash continuation time. The first backwash continuation time is the backwash continuation time in the operation of the fume collector in the backwash mode during a building of the three-dimensional object. The third backwash continuation time is the backwash continuation time in the operation of the fume collector in the backwash mode between end of the building of the three-dimensional object and start of setup for a next building.

[8] An additive manufacturing apparatus according to any one of [1] to [7] is provided. The control apparatus controls the fume collector to increase the rotation speed of the blower when the pressure falls below a predetermined allowable range.

[9] An additive manufacturing apparatus according to any one of [1] to [8] is provided. The control apparatus controls the fume collector to decrease the rotation speed of the blower when the pressure exceeds a predetermined allowable range.

[10] A method of manufacturing three-dimensional object is provided. A desired three-dimensional object is formed by at least covering a building region where the desired three-dimensional object is formed with a chamber and supplying an inert gas to the chamber, while exhausting the inert gas containing fumes from the chamber and removing the fumes contained in the inert gas exhausted from the chamber by a fume collector. The fume collector includes a blower that circulates the inert gas between the chamber and the fume collector by operating at a predetermined rotation speed. The method includes: a solidified layer forming process of laminating a solidified layer by repeating a material layer forming process of forming a material layer by supplying a material powder to the building region and a solidifying process of forming the solidified layer by irradiating the material layer with an energy beam, and a fume removal process of switching the rotation speed of the blower of the fume collector based on a pressure in the chamber.

In the additive manufacturing apparatus according to the disclosure, the pressure in the chamber is detected by a pressure detection apparatus, and the control apparatus controls the fume collector to switch the rotation speed of the blower based on the pressure. When the circulating air volume decreases, the pressure in the chamber decreases. Thus, by switching the rotation speed of the blower such that this pressure is constant or within a predetermined range, it is possible to suppress a decrease in circulating air volume and efficiently exhaust fumes from the chamber.

Hereinafter, embodiments of the disclosure will be described with reference to the drawings. The features shown in the embodiments below may be combined with each other. Also, a disclosure is established independently for each feature.

1. Additive Manufacturing Apparatus 100

FIG. 1 is a schematic configuration diagram of an additive manufacturing apparatus 100 according to this embodiment. The additive manufacturing apparatus 100 of this embodiment includes a chamber 1, a material layer forming apparatus 3, an irradiation apparatus 5, an inert gas supply and exhaust apparatus 6, a pressure detection apparatus 7, and a control apparatus 8. The additive manufacturing apparatus 100 manufactures a desired three-dimensional object by alternately repeating the formation of a material layer 91 by the material layer forming apparatus 3 and the formation of a solidified layer 92 by the irradiation apparatus 5.

In the following description, the direction toward the front in FIG. 1 is defined as the front or front side of the additive manufacturing apparatus 100, and the direction toward the back is defined as the back or back side of the additive manufacturing apparatus 100. Also, the up and down direction in FIG. 1 is defined as the up-down direction (vertical direction) of the additive manufacturing apparatus 100, and the left and right direction is defined as the left-right direction of the additive manufacturing apparatus 100.

1.1. Chamber 1

The chamber 1 at least covers a building region R which is a region in which a desired three-dimensional object is formed. In this embodiment, a building table 4 is arranged in the chamber 1, and the building region R is provided on the building table 4. The building table 4 may be moved in the vertical direction by being driven by a building table driving apparatus 41.

An opening (not shown) used for taking out a three-dimensional object or the like is formed on the front side of the chamber 1, and the opening is provided with a door (not shown) that may be opened and closed. During building, in other words, from the start to the completion of manufacturing of the desired three-dimensional object, the door is closed and the chamber 1 is substantially sealed.

A window 1*a* serving as a transmission window for laser light L is provided on the top plate of the chamber 1. The window 1*a* is formed of a material that may transmit the laser light L. The material of the window 1*a* is selected according to the type of the laser light L. For example, when the laser light L is a fiber laser or YAG laser, the window 1*a* may be made of quartz glass. In this embodiment, two windows 1*a* are arranged side by side in the left-right direction.

1.2. Material Layer Forming Apparatus 3

Figure 2:
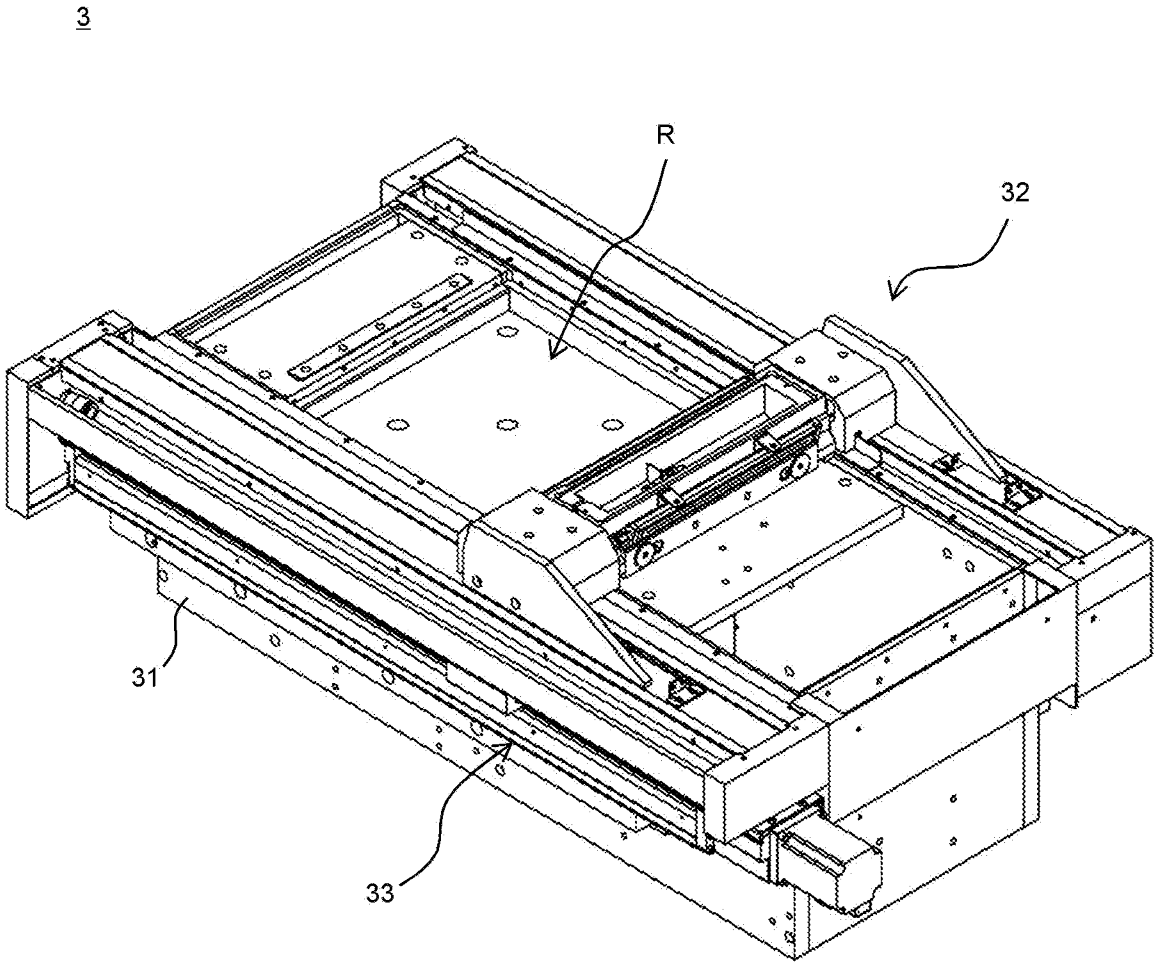
FIG. 2 is a perspective diagram of a material layer forming apparatus 3.

The material layer forming apparatus 3 is provided in the chamber 1 and forms the material layer 91 by supplying material powder to the building region R. As shown in FIG. 2, the material layer forming apparatus 3 includes a base 31 and a recoater head 32 arranged on the base 31. The recoater head 32 is configured to be capable of moving back and forth in the horizontal uniaxial direction by a recoater head driving apparatus 33 that incorporates a driving mechanism such as a motor.

Figure 3:
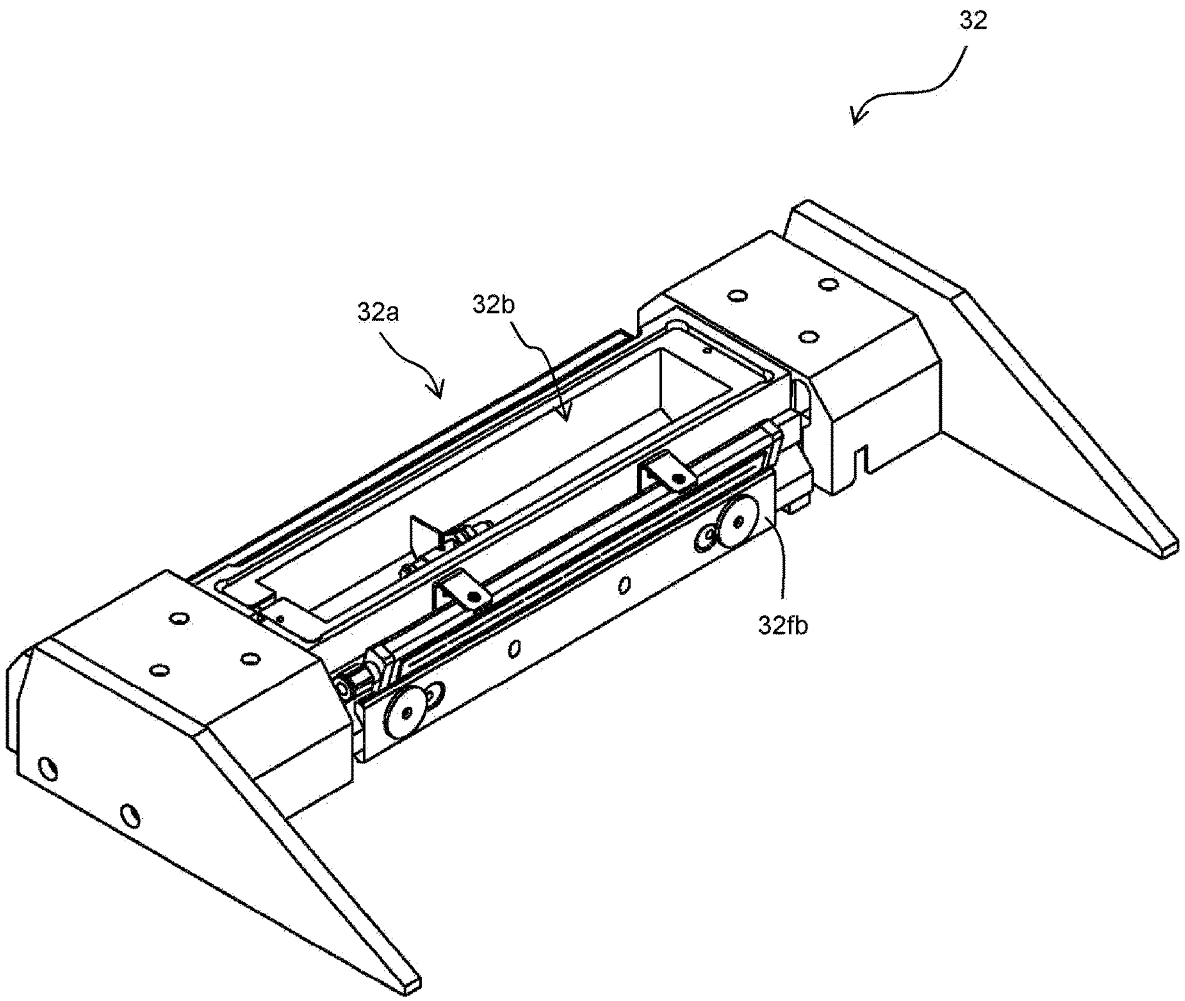
FIG. 3 is a perspective diagram from above of a recoater head 32 of the material layer forming apparatus 3.
Figure 4:
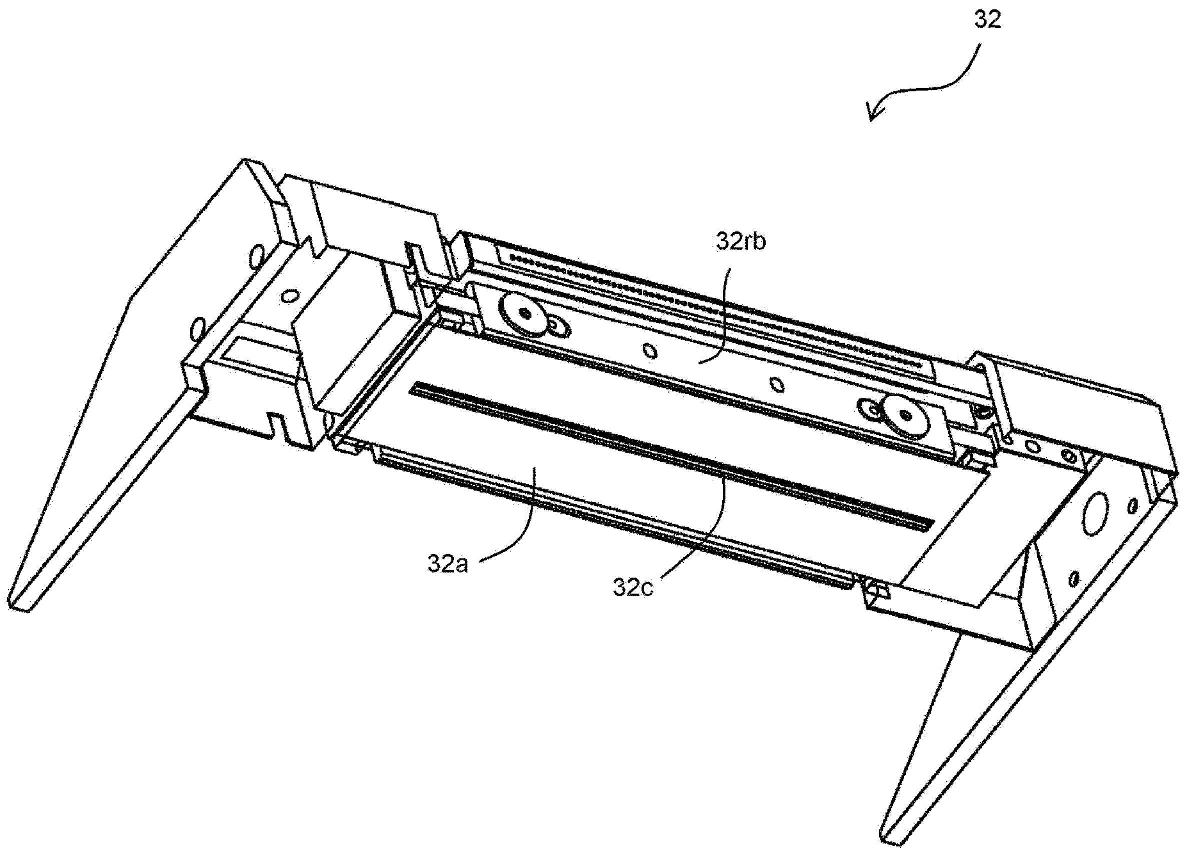
FIG. 4 is a perspective diagram from below of the recoater head 32 of the material layer forming apparatus 3.

As shown in FIGS. 3 and 4, the recoater head 32 includes a material storage part 32*a*, a material supply port 32*b*, and a material discharge port 32*c*. The material supply port 32*b* is provided on the upper surface of the material storage part 32*a* and serves as a receiving port for the material powder supplied from the material supply unit (not shown) to the material storage part 32*a*. The material discharge port 32*c* is provided on the bottom surface of the material storage part 32*a* and discharges the material powder in the material storage part 32*a*. The material discharge port 32*c* has a slit shape extending in the longitudinal direction of the material storage part 32*a*. On the two side surfaces of the recoater head 32, flat plate-shaped blades 32*fb*, 32*rb* are provided. The blades 32*fb*, 32*rb* flatten the material powder discharged from the material discharge port 32*c* so as to form the material layer 91. As shown in FIG. 1, a base plate 90 may be placed on the building table 4 for building, in which case, the first layer of the material layer 91 is formed on the base plate 90.

1.3. Irradiation Apparatus 5

Figure 5:
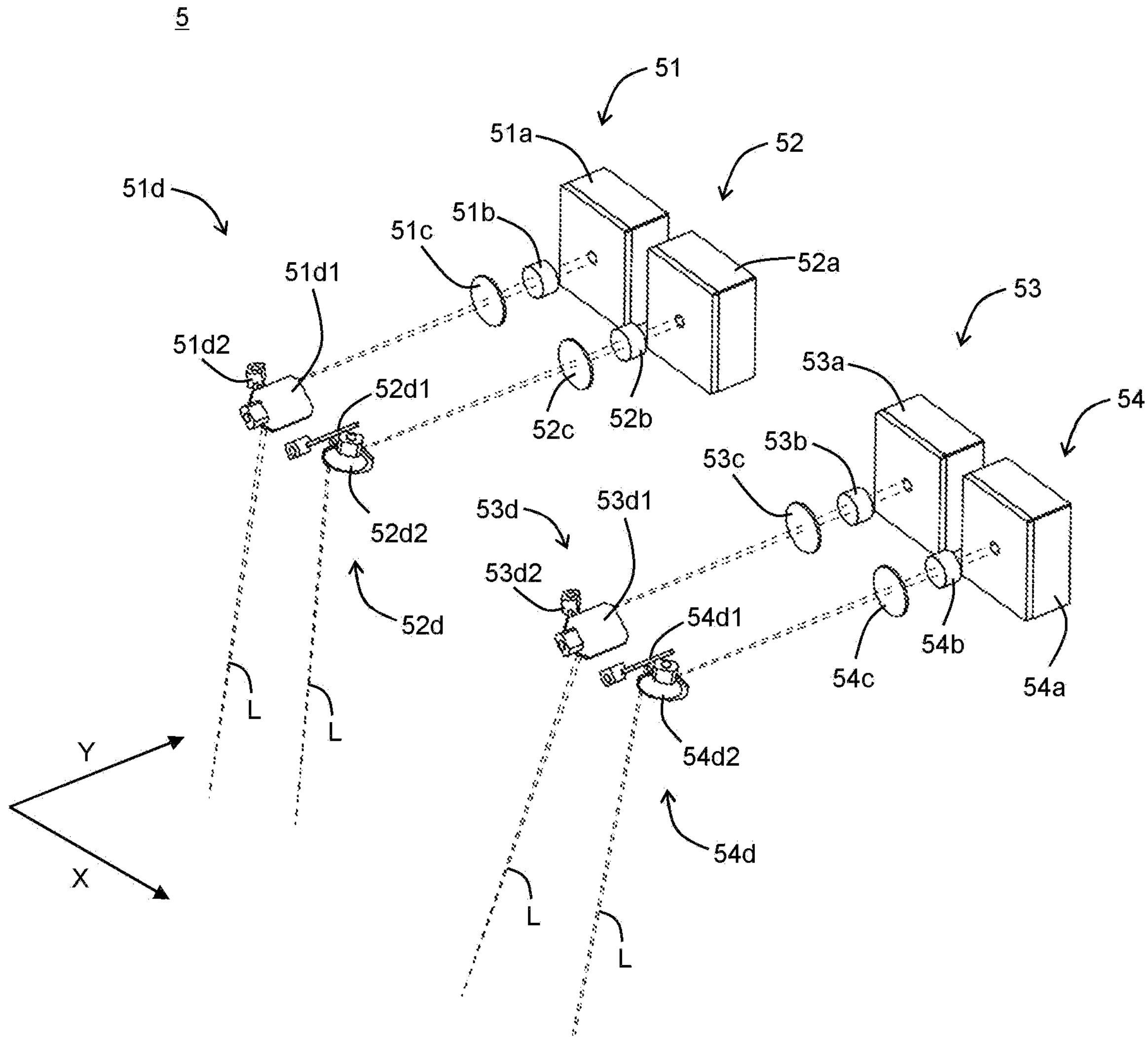
FIG. 5 is a schematic configuration diagram of an irradiation apparatus 5.

As shown in FIGS. 1 and 5, the irradiation apparatus 5 forms the solidified layer 92 by irradiating an energy beam such as the laser light L or an electron beam onto the material layer 91. Preferably, the irradiation apparatus 5 is configured to include at least one light source that generates an energy beam and multiple scanning apparatuses that scan the energy beam, and can simultaneously irradiate multiple energy beams.

The irradiation apparatus 5 of this embodiment is provided above the chamber 1 and is configured to be capable of simultaneously irradiating four laser lights L onto the irradiation region of the material layer 91. Specifically, the irradiation apparatus 5 includes a first irradiation apparatus 51, a second irradiation apparatus 52, a third irradiation apparatus 53, and a fourth irradiation apparatus 54. In such a configuration, up to four laser lights L may be simultaneously irradiated, enabling high-speed building. The first irradiation apparatus 51 and the second irradiation apparatus 52 are housed in the same housing, and the third irradiation apparatus 53 and the fourth irradiation apparatus 54 are housed in the same housing.

As shown in FIG. 5, the first irradiation apparatus 51 includes a light source 51*a*, a focus control unit 51*b*, an adjustment lens 51*c*, and a scanning apparatus 51*d*. The light source 51*a* generates the laser light L. The focus control unit 51*b* has a focus control lens and a motor for moving the focus control lens back and forth, and adjusts the focus position of the laser light L by moving the focus control lens back and forth in the optical axis direction. The adjustment lens 51*c* may be manually adjusted in position and finely tunes optical system errors that may occur when assembling apparatus or similar situations. The scanning apparatus 51*d* is, for example, a galvano scanner, and includes an X-axis galvano mirror 51*d*1 that scans the laser light L in the X-axis direction, which is a horizontal uniaxial direction; a Y-axis galvano mirror 51*d*2 that scans the laser light L in the Y-axis direction, which is another horizontal uniaxial direction orthogonal to the X-axis direction; and an X-axis actuator and a Y-axis actuator (not shown) that rotate the X-axis galvano mirror 51*d*1 and the Y-axis galvano mirror 51*d*2, respectively.

The second irradiation apparatus 52, the third irradiation apparatus 53, and the fourth irradiation apparatus 54 include the same components as the first irradiation apparatus 51. Specifically, the second irradiation apparatus 52 includes a light source 52*a*, a focus control unit 52*b*, an adjustment lens 52*c*, and a scanning apparatus 52*d*. The scanning apparatus 52*d* includes an X-axis galvano mirror 52*d*1, a Y-axis galvano mirror 52*d*2, an X-axis actuator, and a Y-axis actuator. The third irradiation apparatus 53 includes a light source 53*a*, a focus control unit 53*b*, an adjustment lens 53*c*, and a scanning apparatus 53*d*. The scanning apparatus 53*d* includes an X-axis galvano mirror 53*d*1, a Y-axis galvano mirror 53*d*2, an X-axis actuator, and a Y-axis actuator. The fourth irradiation apparatus 54 includes a light source 54*a*, a focus control unit 54*b*, an adjustment lens 54*c*, and a scanning apparatus 54*d*. The scanning apparatus 54*d* includes an X-axis galvano mirror 54*d*1, a Y-axis galvano mirror 54*d*2, an X-axis actuator, and a Y-axis actuator.

Preferably, the X-axis galvano mirror 51*d*1 and the Y-axis galvano mirror 51*d*2 of the first irradiation apparatus 51, and the X-axis galvano mirror 52*d*1 and the Y-axis galvano mirror 52*d*2 of the second irradiation apparatus 52 are arranged to be plane-symmetric with each other. The distance between the downstream side galvano mirrors (in this embodiment, the distance between the X-axis galvano mirror 51*d*1 and the X-axis galvano mirror 52*d*1) is configured to be close to each other. This reduces the difference in shape and energy density of the irradiation spots of the laser light L irradiated by the first irradiation apparatus 51 and the laser light L irradiated by the second irradiation apparatus 52. These two laser lights L pass through the window 1*a* on the left side in FIG. 1 and are irradiated onto the material layer 91. In one example, the first irradiation apparatus 51 and the second irradiation apparatus 52 irradiate the laser light L onto the left half of the building region R in FIG. 1.

Preferably, the X-axis galvano mirror 53*d*1 and the Y-axis galvano mirror 53*d*2 of the third irradiation apparatus 53, and the X-axis galvano mirror 54*d*1 and the Y-axis galvano mirror 54*d*2 of the fourth irradiation apparatus 54 are arranged to be plane-symmetric with each other. The distance between the downstream side galvano mirrors (in this embodiment, the distance between the X-axis galvano mirror 53*d*1 and the X-axis galvano mirror 54*d*1) is configured to be close to each other. This reduces the difference in shape and energy density of the irradiation spots of the laser light L irradiated by the third irradiation apparatus 53 and the laser light L irradiated by the fourth irradiation apparatus 54. These two laser lights L pass through the window 1*a* on the right side in FIG. 1 and are irradiated onto the material layer 91. In one example, the third irradiation apparatus 53 and the fourth irradiation apparatus 54 irradiate the laser light L onto the right half of the building region R in FIG. 1.

The configuration of the irradiation apparatus 5 is not limited to the above example. For instance, in this embodiment, the first to fourth irradiation apparatuses 51, 52, 53, 54 are equipped with the light source 51*a*, 52*a*, 53*a*, 54*a*, respectively, but laser light generated by a single light source may be split by a beam splitter or the like and scanned by each scanning apparatus 51*d*, 52*d*, 53*d*, 54*d*. The irradiation apparatus 5 may be configured to irradiate an electron beam. In that case, the irradiation apparatus 5 includes, for example, a cathode electrode that emits electrons, an anode electrode that converges and accelerates the electrons, a solenoid that forms a magnetic field and converges the direction of the electron beam in one direction, and a collector electrode that is electrically connected to the material layer 91 as the irradiated body and applies voltage between it and the cathode electrode. In this case, the cathode electrode and anode electrode serve as a light source that outputs an electron beam, and the solenoid serves as a scanning apparatus that scans the electron beam.

1.4. Inert Gas Supply and Exhaust Apparatus 6

The inert gas supply and exhaust apparatus 6, as shown in FIG. 1, includes an inert gas supply apparatus 61, a fume collector 62, and duct boxes 68, 69. The inert gas supply and exhaust apparatus 6 supplies inert gas to the chamber 1 and exhausts the inert gas containing fumes generated by the irradiation of the laser light L outside the chamber 1. The inert gas in this disclosure is a gas that does not substantially react with the material layer 91 or the solidified layer 92, is selected according to the type of material, and for example, nitrogen gas, argon gas, helium gas may be used as the inert gas.

The chamber 1 is provided with one or more supply ports and discharge ports for inert gas, and the chamber 1 is connected to the Inert gas supply and exhaust apparatus 6 through the supply ports and discharge ports. In this embodiment, a first supply port 1*b* and second supply ports 1*c* are provided as supply ports. The first supply port 1*b* is provided on the left wall surface of the chamber 1, and the second supply ports 1*c* are provided on the top plate of the chamber 1. Contamination prevention apparatuses 17 are provided on the top plate of the chamber 1 so as to cover the windows 1*a*. The contamination prevention apparatus 17 includes a cylindrical housing 17*a* and a cylindrical diffusion member 17*c* arranged in the housing 17*a*. An inert gas supply space 17*d* is provided between the housing 17*a* and the diffusion member 17*c*. An opening 17*b* is provided on the bottom surface of the housing 17*a* on the radial inner side of the diffusion member 17*c*. Moreover, a large number of small holes are provided in the diffusion member 17*c*. The second supply port 1*c* is provided so as to be able to supply inert gas to the inert gas supply space 17*d*. The clean inert gas supplied to the inert gas supply space 17*d* is filled inside the diffusion member 17*c* through the small holes of the diffusion member 17*c*, and is ejected downward from the opening 17*b* toward the lower side of the contamination prevention apparatus 17. Such a configuration can prevent fumes from adhering to the windows 1*a* and remove fumes from the irradiation path of the laser light L. In this embodiment, two contamination prevention apparatuses 17 are provided so as to cover each of the two windows 1*a*, and the second supply port 1*c* is provided for each contamination prevention apparatus 17.

A discharge port 1*d* for the inert gas is provided on the right wall surface of the chamber 1. In such a configuration, an airflow of inert gas is generated from the first supply port 1*b* to the discharge port 1*d* in the left-right direction of the chamber 1, making it difficult for fumes to accumulate.

The configuration of the supply ports 1*b* and 1*c*, and the discharge port 1*d* for the inert gas is not limited to the example of this embodiment. For example, it may be configured that the first supply port 1*b* and the discharge port 1*d* are provided on the front side and the back side wall surfaces of the chamber 1, respectively, such that an airflow of inert gas is generated in the front-back direction of the chamber 1.

The inert gas supply apparatus 61 supplies inert gas to the chamber 1. The inert gas supply apparatus 61 of this embodiment is connected to the first supply port 1*b* and the second supply ports 1*c*. The chamber 1 during building is filled with inert gas of a predetermined concentration supplied from the inert gas supply apparatus 61 through the first supply port 1*b* and the second supply ports 1*c*. The inert gas supply apparatus 61 is, for example, an inert gas generating apparatus that generates inert gas from air, or a gas cylinder in which inert gas is stored.

Figure 6:
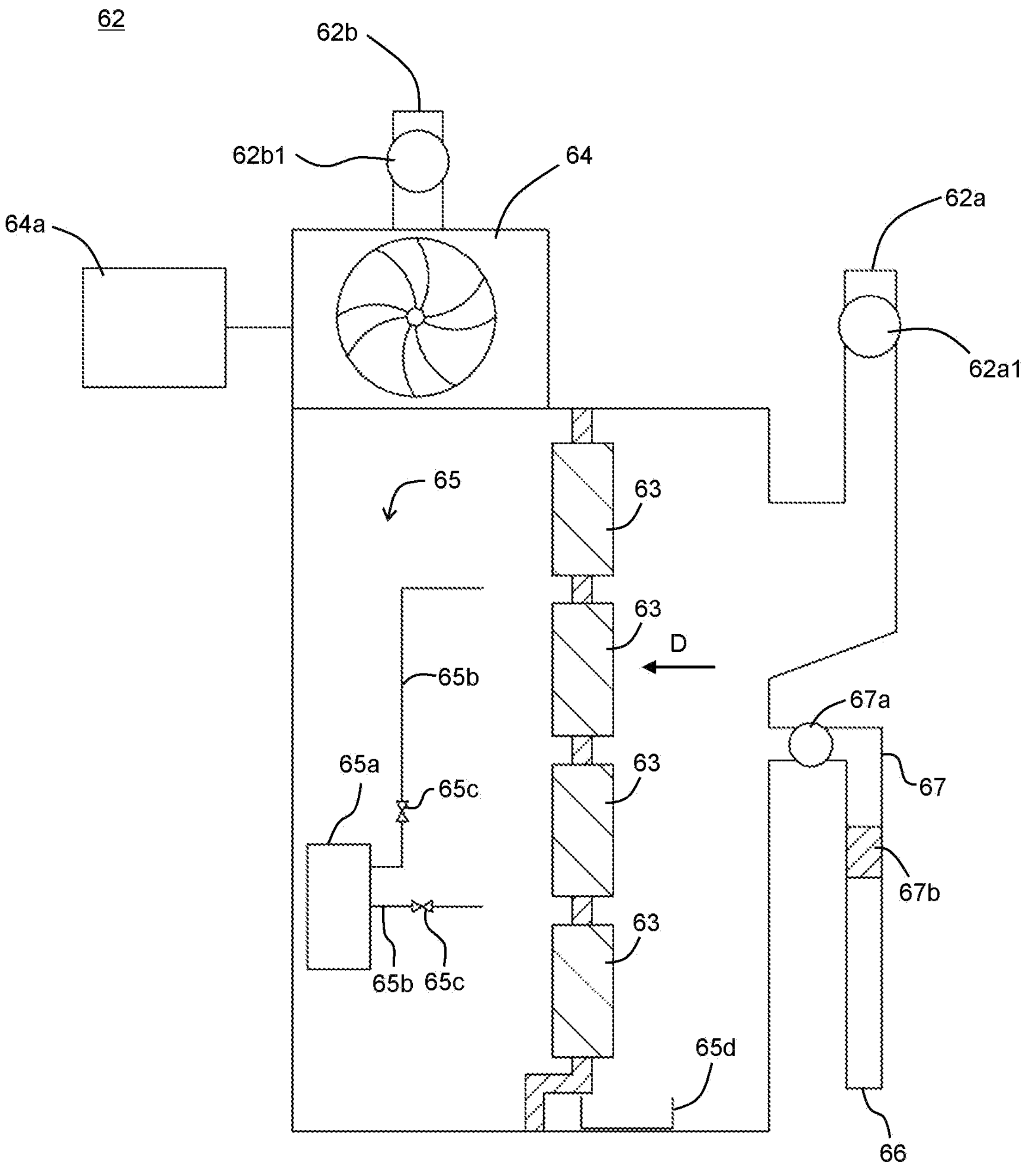
FIG. 6 is a schematic configuration diagram of a fume collector 62.

The fume collector 62 removes fumes from the inert gas that is exhausted together with the fumes from the chamber 1. As shown in FIGS. 1 and 6, the fume collector 62 of this embodiment includes an inlet valve 62*a*1, an outlet valve 62*b*1, fume removal filters 63, a blower 64, a backwash apparatus 65, and an exhaust port 66.

The fume collector 62 has its inlet 62*a* connected to the discharge port 1*d* of the chamber 1 through the duct box 68 by a circulation path 60. Also, the fume collector 62 has its outlet 62*b* connected to the first supply port 1*b* of the chamber 1 through the duct box 69 by a circulation path 60. The inert gas circulates between the chamber 1 and the fume collector 62 via the circulation paths 60. The inlet valve 62*a*1 is arranged on the inlet 62*a* side of the fume collector 62, and the outlet valve 62*b*1 is arranged on the outlet 62*b* side of the fume collector 62. By opening the inlet valve 62*a*1 and the outlet valve 62*b*1, the circulation paths 60 are opened, and the inert gas may be circulated between the chamber 1 and the fume collector 62. Also, by closing the inlet valve 62*a*1 and the outlet valve 62*b*1, the circulation paths 60 are interrupted, and the circulation of inert gas is stopped. The inlet valve 62*a*1 and the outlet valve 62*b*1 may be opened and closed by being controlled by a valve controller 89*d* to be described later.

The fume removal filter 63 is configured to be able to capture fumes from the inert gas that is exhausted together with the fumes from the chamber 1 and that passes through the fume removal filter 63 in a predetermined inflow direction D. As shown in FIG. 6, the inflow direction D is the direction in which the inert gas exhausted from the discharge port 1*d* of the chamber 1 and flowed in from the inlet 62*a* of the fume collector 62 passes through the fume removal filter 63. In the following description, unless otherwise mentioned, the upstream side and downstream side in the inflow direction D of the inert gas are respectively referred to as "upstream side" and "downstream side".

It may also be configured such that at least one fume removal filter 63 is provided, and multiple fume removal filters 63 may be provided in parallel in the inflow direction D, such that each fume removal filter 63 may capture fumes at the same time. In this embodiment, four fume removal filters 63 are provided. By providing multiple fume removal filters 63 in parallel, it is possible to enhance the ability to capture fumes per unit time, and even if the amount of fumes generated increases as the additive manufacturing apparatus 100 becomes larger or the speed of building increases, the fumes can be efficiently removed.

The blower 64 circulates inert gas between the chamber 1 and the fume collector 62 by operating at a predetermined rotation speed. As the blower 64, for example, a blower motor may be used. It is preferable to arrange the blower 64 on the downstream side of the fume removal filters 63. As a result, the inert gas that has passed through the fume removal filters 63 comes into contact with the blower 64, which can suppress adhesion of fumes to the blower 64.

The blower 64 is driven by an alternating current whose frequency has been converted by an inverter apparatus 64*a*. The inverter apparatus 64*a* includes a converter circuit that converts alternating current supplied from an AC power source into direct current, a capacitor that smoothes the converted direct current, and an inverter circuit that converts the smoothed direct current into alternating current of a predetermined frequency, and is controlled by an inverter controller 89*c* to be described later.

The backwash apparatus 65 is configured to perform backwash by blowing inert gas in a direction opposite to the inflow direction D with respect to the fume removal filters 63. By performing backwash, it is possible to remove fumes adhered to the fume removal filters 63 and eliminate clogging.

The backwash apparatus 65 of this embodiment includes a pressure accumulating tank 65*a* arranged in the fume collector 62 and gas supply paths 65*b*. The pressure accumulating tank 65*a* accumulates pressurized inert gas, preferably the same type of inert gas as the inert gas supplied to the chamber 1. The gas supply path 65*b* is, for example, a pipe or hose, with one end connected to the pressure accumulating tank 65*a*, and the other end arranged to face the filter on the downstream side of the fume removal filters 63. A gas supply valve 65*c* is provided midway along the gas supply path 65*b*. The backwash apparatus 65 is controlled by a backwash controller 89*e* to be described later, and the gas supply valve 65*c* may be opened and closed.

By opening the gas supply valve 65*c*, the inert gas supplied from the pressure accumulating tank 65*a* is ejected toward the fume removal filters 63 from the other end of the gas supply path 65*b* for backwash, and by closing the gas supply valve 65*c*, the ejection of inert gas is stopped. When multiple fume removal filters 63 are provided, multiple gas supply paths 65*b* may be arranged to face the fume removal filters 63. As shown in FIG. 6, in this embodiment, two gas supply paths 65*b* are arranged, and the gas supply valve 65*c* is provided in each gas supply path 65*b*. During backwash, the gas supply valves 65*c* of the two gas supply paths 65*b* are alternately opened and closed, and inert gas is alternately ejected to every two of the four fume removal filters 63 (two fume removal filters 63 located on the upper side in FIG. 6 and two fume removal filters 63 located on the lower side). Thus, when performing backwash on multiple fume removal filters 63, the inert gas may be ejected out at sufficient pressure. A collection container 65*d* is arranged below the fume removal filters 63. The fumes removed from the fume removal filters 63 by backwash fall directly below the upstream side and are collected in the collection container 65*d*.

Backwash is preferably performed with the blower 64 stopped and the inlet valve 62*a*1 and the outlet valve 62*b*1 closed, that is, when the circulation of inert gas between the chamber 1 and the fume collector 62 has been stopped. When the circulation of inert gas is interrupted, the exhausting of fumes from the chamber 1 is temporarily stopped. Thus, it is preferable to perform backwash at a timing other than during the irradiation of an energy beam that generates fumes. Preferred timings for performing backwash include, for example, when the material layer 91 is being formed by the material layer forming apparatus 3, or the time between the finish of the building of three-dimensional object and the start of setup for the next building begins.

The exhaust port 66 is provided to exhaust inert gas to the outside when backwash is performed with the inlet valve **62*a*1 and the outlet valve 62*b*1 closed. In this embodiment, an exhaust path 67 that branches on the upstream side of the fume removal filters 63 and downstream side of the inlet valve 62*a*1 is provided, and the tip of the exhaust path 67 is opened as the exhaust port 66. An exhaust valve 67*a* is provided in the exhaust path 67, and when backwash is performed, inert gas is exhausted to the outside from the exhaust port 66 by opening the exhaust valve 67*a*, and the exhausting of inert gas is stopped by closing the exhaust valve 67*a*. The exhaust valve 67*a* may be opened and closed by being controlled by the valve controller 89*d* to be described later. In order to suppress a small amount of fume leakage from the exhaust port 66 to the outside, it is preferable to provide an exhaust filter 67*b* capable of capturing fumes at a position midway in the exhaust path 67 between the exhaust valve 67*a* and the exhaust port 66**.

The fume collector 62 of this embodiment has a fume removal mode and a backwash mode as operation modes, and the operation mode is switched by a mode switching part **89*f* of the control apparatus 8 to be described later. The fume collector 62 is configured such that in fume removal mode, it operates the blower 64 to remove fumes from the inert gas in the fume removal filters 63, and in backwash mode, it stops the blower 64 to perform backwash on the fume removal filters 63 by the backwash apparatus 65. During irradiation of the energy beam by the irradiation apparatus 5, it is preferable that the fume collector 62 be operated in fume removal mode. The operation of the fume collector 62** in the backwash mode is preferably performed at a preferable timing for performing the above-mentioned backwash.

1.5. Pressure Detection Apparatus 7

The pressure detection apparatus 7 detects pressure P in the chamber 1. The pressure detection apparatus 7 is, for example, a pressure sensor. The detection result is output to the control apparatus 8. As shown in FIG. 1, the pressure detection apparatus 7 of this embodiment is arranged in the chamber 1 and configured to be able to constantly monitor the pressure P in the chamber 1. Constant monitoring includes not only a configuration capable of obtaining a continuous signal indicating detected pressure from the pressure detection apparatus 7, but also a configuration capable of obtaining a signal indicating detected pressure from the pressure detection apparatus 7 at a predetermined short cycle.

The detection position of the pressure P in the chamber 1 is not particularly limited. When using a pressure sensor as the pressure detection apparatus 7, it is preferable to arrange the pressure sensor near the first supply port **1*b*** where there is less accumulation of fumes, from the viewpoint of suppressing deterioration of the pressure sensor due to fumes.

2. Control Apparatus 8

Figure 7:
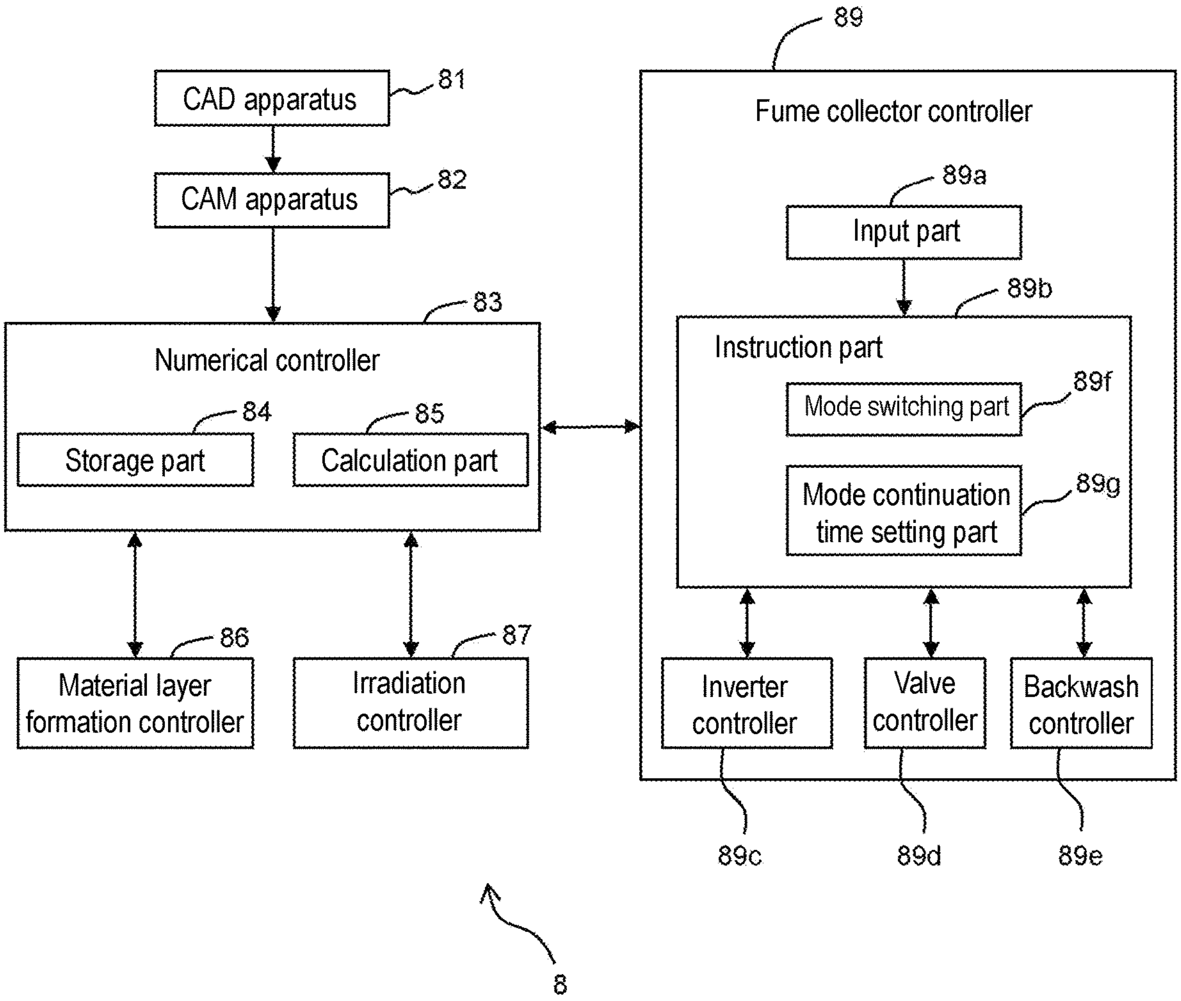
FIG. 7 is a block diagram showing the configuration of a control apparatus 8.

Next, the control apparatus 8 for controlling the additive manufacturing apparatus 100 will be described, limited to configurations related to this disclosure. FIG. 7 is a block diagram showing the configuration of the control apparatus 8. The control apparatus 8 of this embodiment includes a numerical controller 83, and a material layer formation controller 86, an irradiation controller 87, and a fume collector controller 89, which are controllers for each component of the additive manufacturing apparatus 100. Moreover, a CAD apparatus 81 and a CAM apparatus 82 are provided outside the control apparatus 8.

Each component of the control apparatus 8, the CAD apparatus 81, and the CAM apparatus 82 may be realized by software or hardware. When realized by software, various functions may be realized by executing a computer program by a CPU. The program may be stored in a built-in storage part or in a non-temporary computer-readable recording medium. Moreover, a program stored in an external storage part may be read out and realized by so-called cloud computing. When realized by hardware, it may be realized by various circuits such as ASIC (Application Specific Integrated Circuit), FPGA (Field Programmable Gate Array), or DRP (Dynamically Reconfigurable Processor). In this embodiment, various information and concepts containing them are handled, but they may be represented by high and low of signal values as a binary bit set composed of 0 or 1, and communication and calculation may be executed according to the above-mentioned software or hardware mode.

The CAD apparatus 81 is for creating three-dimensional shape data (CAD data) indicating the shape and dimensions of a three-dimensional object. The CAM apparatus 82 is for creating operation procedure data (CAM data) of the components of the additive manufacturing apparatus 100 based on the CAD data. The CAM data includes, for example, data on the irradiation position and irradiation conditions of the laser light L in each material layer 91. The CAM data is output to the numerical controller 83. The CAM data may be output to a non-temporary recording medium such as flash memory and may be taken into the numerical controller 83 via the recording medium. Alternatively, a configuration may be adopted in which a CAM computer and the numerical controller 83 are connected via a network, and the CAM data is output to the numerical controller 83.

The numerical controller 83 creates operation instructions for the components of the additive manufacturing apparatus 100. The numerical controller 83 includes a storage part 84 and a calculation part 85. The calculation part 85 performs processing with a numerical control program generated based on the CAM data stored in the storage part 84, and outputs operation instructions to the controller of the components of the additive manufacturing apparatus 100 in the form of signal or data of operation instruction value. The storage part 84 stores CAM data, numerical control programs, or the like.

The material layer formation controller 86 controls the recoater head driving apparatus 33 to move the recoater head 32 back and forth in the horizontal uniaxial direction. As a result, the material layer 91 is formed in the building region R.

The irradiation controller 87 controls the operation of the first irradiation apparatus 51, the second irradiation apparatus 52, the third irradiation apparatus 53, and the fourth irradiation apparatus 54 that constitute the irradiation apparatus 5 based on operation instructions. Specifically, the irradiation controller 87 controls the light sources **51*a*, 52*a*, 53*a*, 54*a*, the focus control units 51*b*, 52*b*, 53*b*, 54*b*, and the scanning apparatuses 51*d*, 52*d*, 53*d*, 54*d*. As a result, the laser light L is irradiated at a predetermined position in the material layer 91** under predetermined conditions.

The fume collector controller 89 controls the fume collector 62 based on operation instructions. In this embodiment, the fume collector controller 89 includes an input part **89*a*, an instruction part 89*b*, the inverter controller 89*c*, the valve controller 89*d*, and the backwash controller 89*e***.

The input part **89*a* is for an operator to input information necessary for determining the operating conditions of the fume collector 62 and is composed of, for example, a touch panel, a keyboard, or a mouse. The input information is sent to the instruction part 89***b*.

The instruction part 89*b* determines the specific operating conditions of the fume collector 62 based on the operation instructions sent from the numerical controller 83 and the input information sent from the input part 89*a*. In this embodiment, the instruction part 89*b* includes the mode switching part 89*f* and a mode continuation time setting part 89*g*.

The mode switching part 89*f* switches the operation mode of the fume collector 62. Specifically, the mode switching part 89*f* outputs information on the operation mode to the inverter controller 89*c*, the valve controller 89*d*, and the backwash controller 89*e*. In this embodiment, the mode switching part 89*f* switches from the fume removal mode to the backwash mode based on a removal continuation time tr to be described later, and switches from the backwash mode to the fume removal mode based on a backwash continuation time tc to be described later.

The mode continuation time setting part 89*g* sets the removal continuation time tr, which is the time per one operation of the fume collector 62 in the fume removal mode. Also, the mode continuation time setting part 89*g* sets the backwash continuation time tc, which is the time per one operation of the fume collector 62 in the backwash mode.

The inverter controller 89*c* switches the frequency of the alternating current output by the inverter apparatus 64*a* based on the operating conditions sent from the instruction part 89*b*, and increases or decreases the voltage according to the frequency, for example, by V/f control. Specifically, the inverter controller 89*c* operates the blower 64 at a predetermined rotation speed according to the operating conditions during operation in the fume removal mode, and stops the blower 64 during operation in the backwash mode. Also, in this embodiment, the inverter controller 89*c* is configured to switch the rotation speed of the blower 64 based on the pressure P in the chamber 1 detected by the pressure detection apparatus 7.

The valve controller 89*d* switches the opening and closing of the inlet valve 62*a*1, the outlet valve 62*b*1, and the exhaust valve 67*a* based on the operating conditions sent from the instruction part 89*b*. In this embodiment, the valve controller 89*d* opens the inlet valve 62*a*1 and the outlet valve 62*b*1 and closes the exhaust valve 67*a* during operation in the fume removal mode, and closes the inlet valve 62*a*1 and the outlet valve 62*b*1 and opens the exhaust valve 67*a* during operation in the backwash mode.

The backwash controller 89*e* controls the backwash apparatus 65 based on the operating conditions sent from the instruction part 89*b*. Specifically, the backwash controller 89*e* repeatedly performs control of closing the gas supply valve 65*c* during operation in the fume removal mode, opening the gas supply valve 65*c* for a predetermined time during operation in the backwash mode, then temporarily closing the gas supply valve 65*c*, and opening the gas supply valve 65*c* again for a predetermined time after accumulating pressure in the pressure accumulating tank 65*a*.

3. Method of Manufacturing an Additive Manufactured Object

Figure 8:
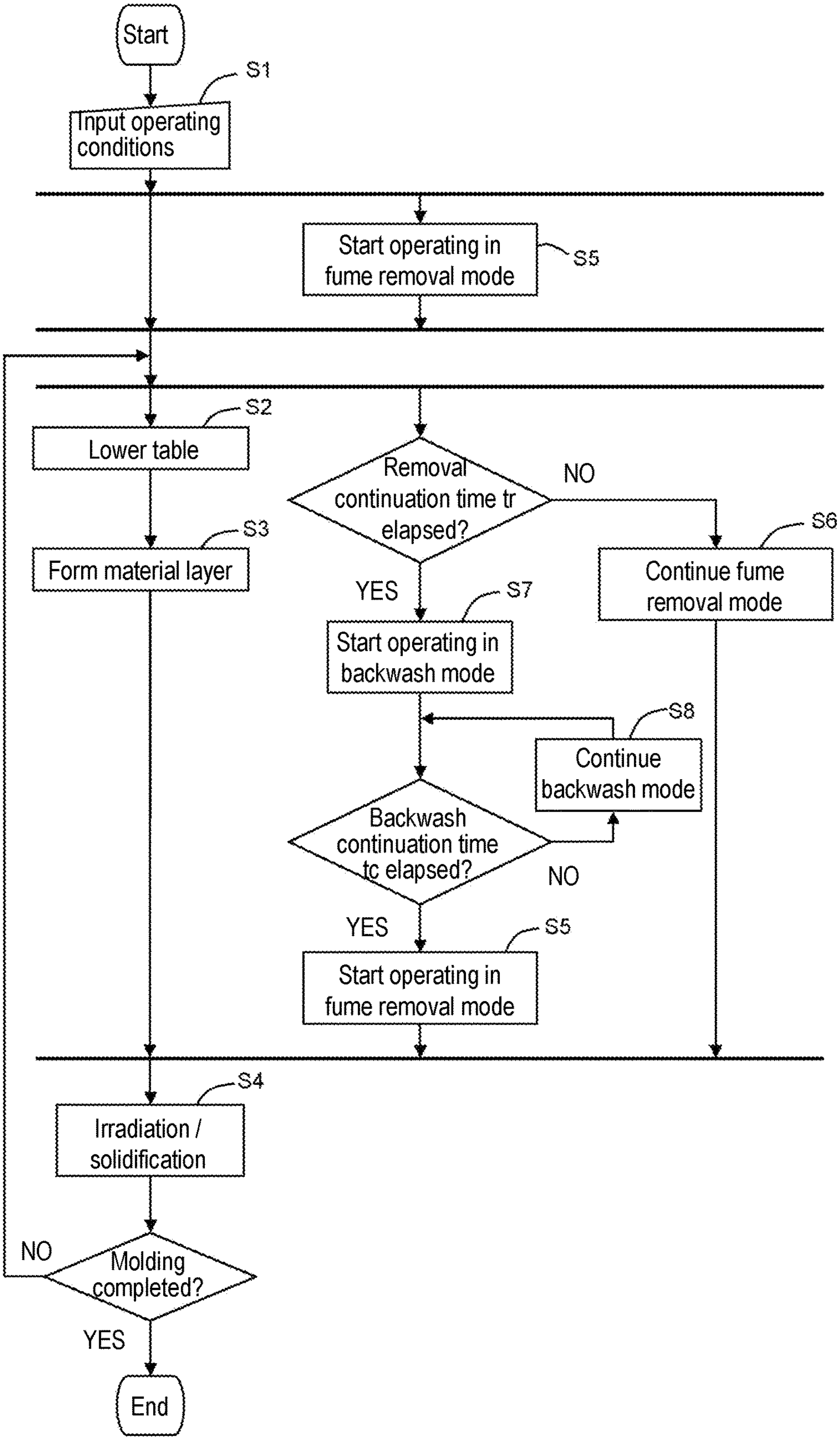
FIG. 8 is a flowchart showing a method of manufacturing a three-dimensional object by the additive manufacturing apparatus 100.

Next, a method of manufacturing an additive manufactured object by the additive manufacturing apparatus 100 according to this embodiment will be described, along with a more detailed description of the control of the fume collector 62. The method of manufacturing of this embodiment includes a solidified layer forming process, a fume removal process, and a backwash process. FIG. 8 is a flowchart of the additive manufacturing method of this embodiment.

In preparation for building, the operator inputs information related to the operating conditions of the fume collector 62 into the input part 89*a* of the control apparatus 8, and the input part 89*a* takes in the input information (step S1). Also, an inert gas is supplied to the chamber 1 by the inert gas supply apparatus 61 to fill the chamber 1. The fume collector controller 89 starts operating the fume collector 62 in fume removal mode. Specifically, the valve controller 89*d* opens the inlet valve 62*a*1 and the outlet valve 62*b*1, closes the exhaust valve 67*a*, and operates the blower 64 at a predetermined rotation speed by the inverter controller 89*c*.

Figure 9:
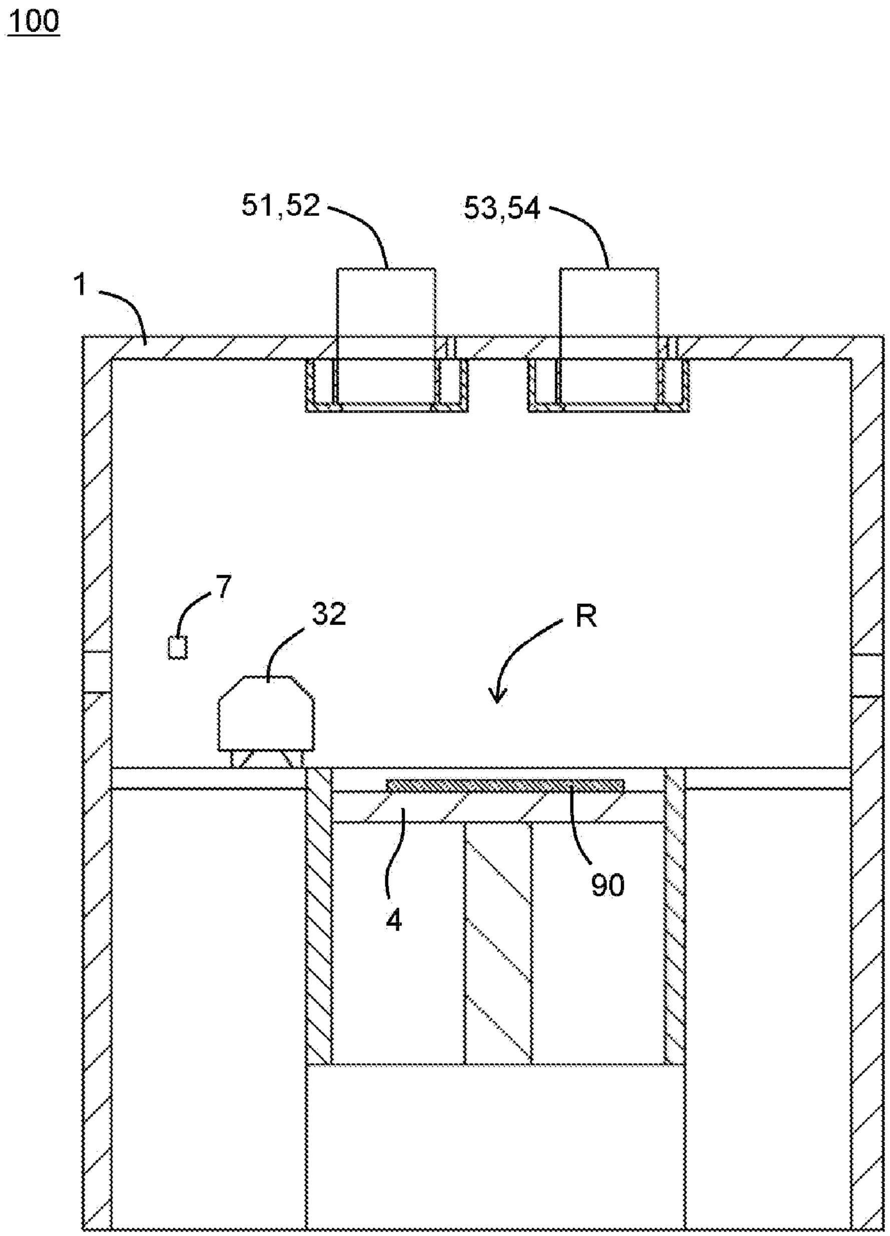
FIG. 9 is a diagram showing a method of manufacturing an additive manufactured object by the additive manufacturing apparatus 100, and shows the state at the start of building.

After the preparation for building is ready, the solidified layer forming process is executed. In the solidified layer forming process, the solidified layer 92 is laminated by repeating a material layer forming process of supplying material powder to the building region R to form the material layer 91, and a solidifying process of forming the solidified layer 92 by irradiating the material layer 91 with an energy beam. First, the first material layer forming process is executed. Specifically, as shown in FIG. 9, the building table 4 on which the base plate 90 is placed is lowered and adjusted to an appropriate position (step S2). The material layer formation controller 86 controls the recoater head driving apparatus 33, for example, to move the recoater head 32, which is waiting on the left side of the building region R in FIG. 9, from the left side to the right side of the building region R in a horizontal uniaxial direction. As a result, material powder is supplied onto the building table 4 to form a first layer of the material layer 91 (step S3). The manner in which the recoater head 32 moves during the formation of the material layer 91 is not limited to the above example, for example, the recoater head 32 may form one layer of the material layer 91 by moving back and forth in the left-right direction of the building region R.

Figure 10:
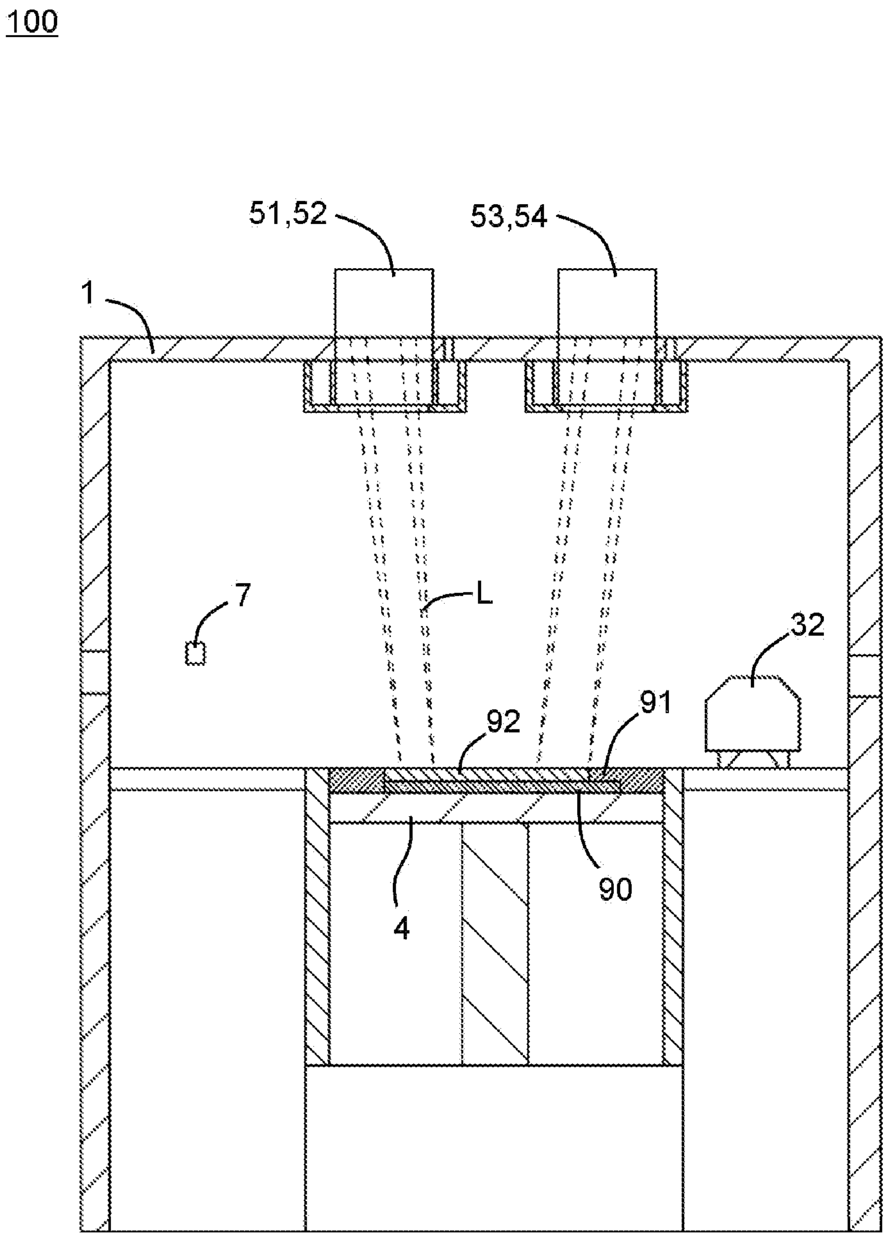
FIG. 10 is a diagram showing a method of manufacturing an additive manufactured object by the additive manufacturing apparatus 100, and shows the state where the solidifying process of the first layer is being executed.

Next, the first solidifying process is executed. Specifically, the irradiation controller 87 controls the irradiation apparatus 5 to irradiate the laser light L. As a result, as shown in FIG. 10, the laser light L is irradiated to a predetermined irradiation region of the first layer of the first material layer 91 to solidify the material layer 91, and a first layer of the solidified layer 92 is formed (step S4).

Next, the second material layer forming process is performed. After lowering the height of the building table 4 by one layer of the material layer 91, a second layer of the material layer 91 is formed to cover the first layer of the solidified layer 92 by moving the recoater head 32 from the right side to the left side of the building region R in FIG. 10. Subsequently, the second solidifying process is performed. The second layer of the material layer 91 is solidified by irradiating the laser light L to a predetermined irradiation region of the second layer of the material layer 91, and a second layer of the solidified layer 92 is formed. The material layer forming process and the solidifying process are repeated until the formation of a predetermined number of solidified layers 92 is completed. The adjacent solidified layers 92 are strongly adhered to each other.

In parallel with the solidified layer forming process, a fume removal process and a backwash process are executed. In the fume removal process, the fume collector 62 removes fumes from the inert gas that is exhausted together with the fumes from the chamber 1. In this embodiment, the fume removal process is executed by operating the fume collector 62 in a fume removal mode (step S5).

In this embodiment, in the fume removal process, the control apparatus 8 controls the fume collector 62 to switch the rotation speed of the blower 64 based on the pressure P in the chamber 1. Specifically, in order to keep the pressure P in the chamber 1 substantially constant or within a predetermined allowable range, the inverter controller 89*c* of the control apparatus 8 switches the frequency of alternating current output from the inverter apparatus 64*a* to increase or decrease the rotation speed of the blower 64.

In one example, the inverter controller 89*c* increases the rotation speed of the blower 64 when the pressure P in the chamber 1 falls below a predetermined allowable range. Also, the inverter controller 89*c* decreases the rotation speed of the blower 64 when the pressure P in the chamber 1 exceeds a predetermined allowable range. Specifically, when an upper limit value Pmax and a lower limit value Pmin are set as the allowable range of pressure P, at the point where the pressure P in the chamber 1 becomes $P<Pmin$, the inverter controller 89*c* increases the frequency of alternating current output from the inverter apparatus 64*a* and increases the rotation speed of the blower 64. Also, for the pressure P in the chamber 1, at the point where $Pmax<P$, the inverter controller 89*c* decreases the frequency of alternating current output from the inverter apparatus 64*a* and decreases the rotation speed of the blower 64.

After the pressure P in the chamber 1 has been restored to within the allowable range ($Pmin \leq P \leq Pmax$) by increasing or decreasing the rotation speed of the blower 64, for example, the increase or decrease in the rotation speed of the blower 64 may be stopped at the point when the pressure P is restored to within the allowable range, and the rotation speed at that point may be maintained until the pressure P deviates from the allowable range again. Alternatively, the increase or decrease in the rotation speed of the blower 64 may continue even after the pressure P has been restored to within the allowable range, the increase or decrease of the rotation speed of the blower 64 may be stopped at the point where the pressure P reaches a predetermined reference pressure Pref that satisfies $Pmin \leq Pref \leq Pmax$, and the rotation speed at that point may be maintained until the pressure P deviates from the allowable range again. The reference pressure Pref may be set, for example, to $Pref=(Pmin+Pmax)/2$.

When fumes adhere to and clog the fume removal filters 63, the circulating air volume of inert gas between the chamber 1 and the fume collector 62 decreases, resulting in a decrease in the exhaust efficiency of fumes. At this time, as the circulating air volume decreases, the pressure Pin the chamber 1 also decreases. Thus, by increasing the rotation speed of the blower 64 when the pressure Pin the chamber 1 falls below the allowable range, the circulating air volume between the chamber 1 and the fume collector 62 may be increase, thereby preventing the fumes from accumulating.

At this time, it is not necessary to interrupt the irradiation of the energy beam, so it is possible to suppress a reduction in the building quality due to clogging of the fume removal filters 63 without increasing the building time. In particular, when multiple energy beams are irradiated simultaneously as in this embodiment, the amount of fumes generated per unit time increases. As a result, there may be an increase in building time due to the need for frequent or prolonged backwash in order to clear the clogging of the fume removal filters 63, or there may be a decrease in circulating air volume due to clogging during irradiation on one layer of the material layer 91. By controlling the rotation speed of the blower 64, it is possible to maintain circulating air volume, such that the number and time of backwash can be reduced, and also situations where irradiation is interrupted due to a decrease in circulating air volume can be avoided.

On the other hand, when the circulating air volume of inert gas between the chamber 1 and the fume collector 62 is too large, there is a risk that the material powder forming the material layer 91 will be blown away. Thus, by reducing the rotation speed of the blower 64 when the pressure P in the chamber 1 exceeds the allowable range, the circulating air volume between the chamber 1 and the fume collector 62 can be reduced, thereby avoiding such a situation.

In this regard, in order to avoid a decrease in the fume exhaust efficiency, it is conceivable to detect the wind speed in the chamber 1 or the circulation paths 60, and to control the rotation speed of the blower 64 based on the detection results. However, since the wind speed is likely to vary depending on the detection position in the chamber 1 or the circulation paths 60, adjustment of the detection position may become complicated, and the detection apparatus may become more complex in order to measure the wind speed at multiple locations.

In contrast, in this embodiment, the rotation speed of the blower 64 is controlled based on the pressure in the chamber 1. The pressure in the chamber 1 correlates with the circulating air volume of inert gas, and the pressure distribution inside the chamber 1 is substantially uniform. Thus, it is possible to accurately control the rotation speed of the blower 64 to avoid a decrease in fume exhaust efficiency using a relatively simple pressure detection apparatus 7, regardless of the pressure detection position.

In this embodiment, the removal continuation time tr is set by the mode continuation time setting part 89*g*. The mode switching part 89*f* continues the fume removal mode until the removal continuation time tr has elapsed from the start of operation of the fume collector 62 in the fume removal mode (in other words, from the start of fume removal process) (step S6), and switches to the backwash mode at the point when the removal continuation time tr has elapsed. This ends the first fume removal process.

In the backwash process, backwash is performed by the backwash apparatus 65. In this embodiment, the backwash process is executed by operating the fume collector 62 in backwash mode (step S7). Specifically, the inverter controller 89*c* stops the blower 64, the valve controller 89*d* closes the inlet valve 62*a*1 and the outlet valve 62*b*1 and opens the exhaust valve 67*a*, and the backwash controller 89*e* opens the gas supply valve 65*c*.

During building, it is preferable that the mode switching part 89*f* switches the operation mode such that the operation of the fume collector 62 in the backwash mode is performed at the time of forming the material layer 91. In other words, it is preferable that the backwash process is performed during the material layer forming process. The backwash may be performed each time one layer of the solidified layer 92 is formed, in other words, in each material layer forming process, or may be performed in an immediately subsequent material layer forming process each time multiple layers of the solidified layer 92 are formed by performing the solidified layer forming process multiple times. By performing backwash in each material layer forming process, even when the amount of fume generated at the time of forming one layer of the solidified layer 92 is relatively large during the building of a large-region building or the like, it is possible to effectively suppress a decrease in circulating air volume due to clogging of the fume removal filters 63. On the other hand, since it is easier to remove fumes after a certain period of time than immediately after they adhere to the fume removal filters 63, by performing backwash in the material layer forming process after multiple solidified layer forming processes, fumes can be efficiently removed.

In this embodiment, the backwash continuation time tc is set by the mode continuation time setting part 89*g*. The mode switching part 89*f* continues the backwash mode until the backwash continuation time tc has elapsed from the start of operation of the fume collector 62 in the backwash mode (in other words, the start of the backwash process) (step S8), and switches the operation mode to again start operation in the fume removal mode at the point when the backwash continuation time tc has elapsed (step S5). This ends the first backwash process.

With such a configuration, it is possible to maintain the circulating air volume of inert gas by controlling the rotation speed of the blower 64 in the fume removal process, and to further suppress a decrease in circulating air volume by eliminating clogging of the fume removal filters 63 in the backwash process, making it possible to more efficiently remove fumes from the chamber 1.

In this embodiment, a first backwash continuation time tc1 and a second backwash continuation time tc2 are set as the backwash continuation time tc when operating the fume collector 62 in the backwash mode during the formation of a three-dimensional object. The first backwash continuation time tc1 is the backwash continuation time tc in an immediately subsequent operation of the fume collector 62 in the backwash mode in a case where the pressure P in the chamber 1 falls within a predetermined allowable range by the control apparatus 8 controlling the fume collector 62 in the fume removal. In this embodiment, when Pmin P Pmax is achieved by controlling the rotation speed of the blower 64 by the inverter controller 89*c* in the fume removal mode, in an immediately subsequent period from the switching to the backwash mode until the first backwash continuation time tc1 has elapsed, the backwash process is performed.

Preferably, the first backwash continuation time tc1 is set to be smaller than a process time tm of one material layer forming process (in other words, the time required to form one layer of the material layer 91). Thereby, the backwash can be completed during a single material layer forming process, and there is no need to interrupt building.

Figure 11A:
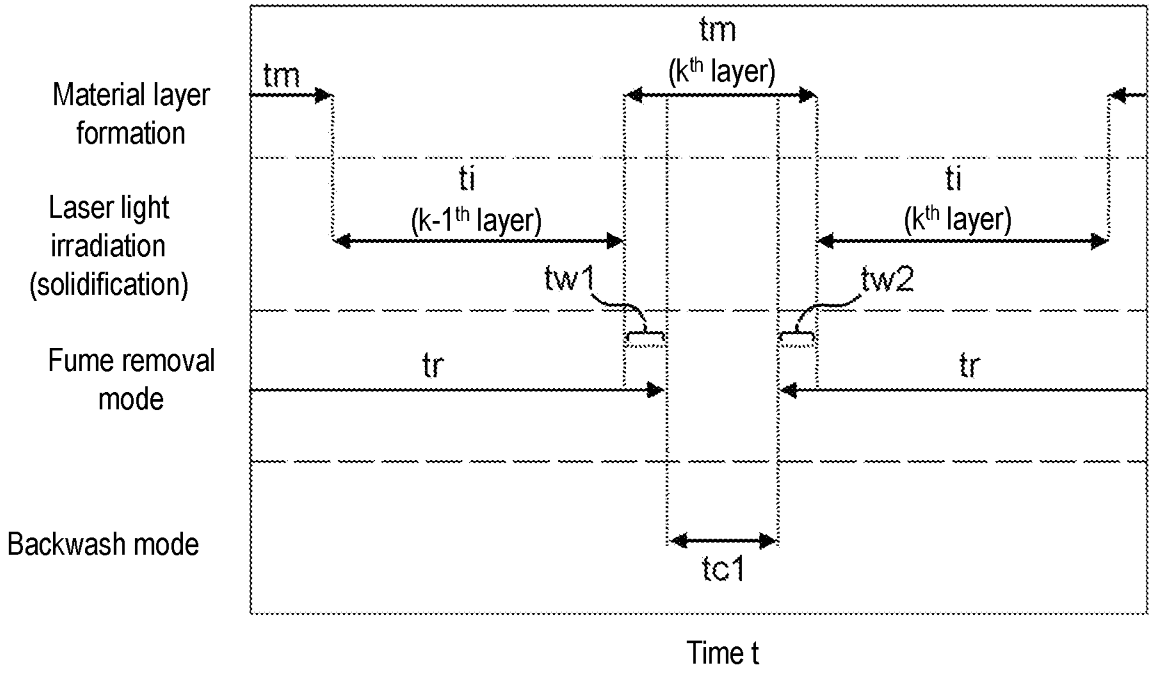
FIG. 11A is a diagram showing an example of the timing of switching from the fume removal mode to the backwash mode based on a first backwash continuation time tc1.

FIG. 11A is a diagram showing an example of the timing of switching from the fume removal mode to the backwash mode based on the first backwash continuation time tc1. Ti in the drawing indicates the process time of one solidifying process (in other words, the time required for irradiating the laser light L on layer of the material layer 91). When switching to the backwash mode during the material layer forming process of a $k^{th}$ layer, it is preferable to perform the switching after a predetermined time tw1 has elapsed after the solidifying process of a $(k-1)^{th}$ layer is ended and the material layer forming process of the $k^{th}$ layer is started. By continuing the operation in the fume removal mode until the predetermined time tw1 has passed even after the solidifying process of the $(k-1)^{th}$ layer is ended, it is possible to prevent fumes generated just before the laser light L irradiation is ended from remaining in the chamber 1. The subsequent switching from the backwash mode to the fume removal mode is preferably performed at a predetermined time tw2 before the point where the material layer forming process of the $k^{th}$ layer is ended and the solidifying process of the $k^{th}$ layer is started. By starting operation of the fume collector 62 in the fume removal mode before the solidifying process for $k^{th}$ layer is started, it is possible to start irradiation of the laser light L while the inside of the chamber 1 is maintained at an appropriate pressure P.

The second backwash continuation time tc2 is the backwash continuation time tc in an immediately subsequent operation of the fume collector 62 in the backwash mode in a case where the pressure P falls below the allowable range, even if the rotation speed of the blower 64 reaches a predetermined upper limit r by the control apparatus 8 controlling the fume collector 62 in the fume removal mode. The second backwash continuation time tc2 is set longer than the first backwash continuation time tc1. In this embodiment, when during operation in fume removal mode, P<Pmin and the pressure P is not restored within an allowable range (Pmin P Pmax) even if the frequency of alternating current output from the inverter apparatus 64*a* is increased and the rotation speed of the blower 64 reaches the predetermined upper limit r, in an immediate subsequent period from the switching to the backwash process until the second backwash continuation time tc2 has elapsed, the backwash mode is performed. This allows for a longer backwash on the fume removal filters 63 that are clogged to such an extent that the pressure P does is not restored even when the rotation speed of the blower 64 reaches the upper limit r, thereby suppressing a decrease in circulating air volume of inert gas in subsequent building.

The second backwash continuation time tc2 may be set smaller than the process time tm of one material layer forming process so as to minimize the impact on the building time. Alternatively, priority may be given to elimination of the clogging the fume removal filters 63, and the second backwash continuation time tc2 may be set such that backwash continues for a predetermined time even after the end of the material layer forming process (for example, such that tm<tc2) is ended. In the operation in the backwash mode based on the second backwash continuation time tc2, it is preferable to secure the predetermined time tw1, tw2 for mode switching, as in the first backwash continuation time tc1.

Figure 11B:
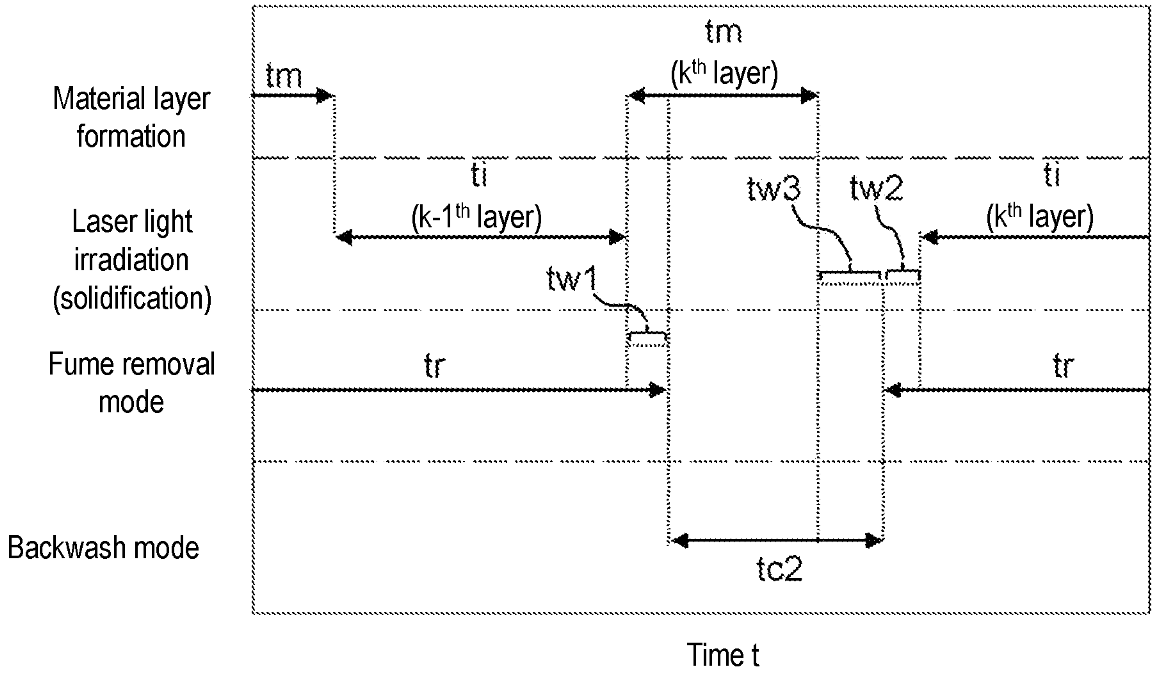
FIG. 11B is a diagram showing an example of the timing of switching from the fume removal mode to the backwash mode based on a second backwash continuation time tc2.

FIG. 11B is a diagram showing an example of the timing of switching from the fume removal mode to the backwash mode based on the second backwash continuation time tc2. In this example, after the solidifying process of the $(k-1)^{th}$ layer is ended and the material layer forming process for the $k^{th}$ layer has started, switching to the backwash mode is performed after the predetermined time tw1 has elapsed. Moreover, even after the end of the material layer forming process for the $k^{th}$ layer, the backwash continues for a predetermined time tw3 and then switching to the fume removal mode is performed. Thus, there is a relationship where tw1+tc2=tm+tw3. After switching to the fume removal mode, the solidifying process for the $k_{th}$ layer starts after a further predetermined time tw2 has elapsed. In such a configuration, each time a backwash process is performed, the building time is extended by time (tw2+tw3).

Furthermore, multiple second backwash continuation times tc2 with different values may be set and may be selected as appropriate. For example, in a case where P<Pmin and the pressure P is not restored to the allowable range even if the rotation speed of the blower 64 is increased to the upper limit r, a relatively small value may be selected from multiple second backwash continuation times tc2 when the value of the pressure P is relatively large, and a relatively large value may be selected from multiple second backwash continuation times tc2 when the value of the pressure P is relatively small. By setting multiple second backwash continuation times tc2, the impact on the building time due to backwash can be suppressed.

The removal continuation time tr, the first backwash continuation time tc1, and the second backwash continuation time tc2 may be an input to the input part 89*a* of the control apparatus 8 by the operator as information related to the operating conditions of the fume collector 62. Alternatively, a configuration may be adopted in which a database recording the optimal removal continuation time tr, the first backwash continuation time tc1, and the second backwash continuation time tc2 according to the building conditions, or a function for obtaining the removal continuation time tr, the first backwash continuation time tc1, and the second backwash continuation time tc2 from the building conditions may be created in advance, and the mode continuation time setting part 89*g* may use them to automatically set the removal continuation time tr, the first backwash continuation time tc1, and the second backwash continuation time tc2.

The above processes are repeated until the building is completed. During or after the building, machining such as cutting by a machining device (not shown) may be performed on the solidified layer 92 as necessary. The machining device, for example, is provided in the chamber 1 and is configured by attaching a tool (for example, an end mill) for performing machining such as cutting to a machining head, and performs machining by appropriately moving the machining head in the horizontal and vertical directions. After the building is completed, a built object may be obtained by discharging unsolidified material powder and cutting waste. The blower 64 of the fume collector 62 may be stopped during machining, and the fume collector 62 may be operated in the backwash mode during machining.

In this embodiment, the operation of the fume collector 62 in the backwash mode is performed during the period from the end of the building of a three-dimensional object to the start of setup for the next building. At this time, as the backwash continuation time tc, the mode continuation time setting part 89*g* sets a third backwash continuation time that is longer than the first backwash continuation time tc1. By performing relatively long backwash using timing when the laser light L irradiation is not performed for a long time until the start of setup for the next building, it is possible to eliminate clogging of the fume removal filters 63 and suppress a decrease in circulating air volume of inert gas in the next building.

The third backwash continuation time may be, similar to the setting mode of the removal continuation time tr, an input to the input part 89*a* by the operator as information related to the operating conditions of the fume collector 62, or it may be configured such that the mode continuation time setting part 89*g* automatically sets it using a database or function. Since the degree of clogging of the fume removal filters 63 and the irradiation stop time until the start of setup for the next building vary depending on the building situation, automatic setting by the mode continuation time setting part 89*g* tends to make the third backwash continuation time too large or too small. Thus, in order to set a third backwash continuation time that is necessary and sufficient for eliminating clogging of the fume removal filters 63, it is preferable that the third backwash continuation time is input and set to the input part 89*a* by the operator each time the building of a three-dimensional object ends.

4. Other Embodiments

The disclosure may also be implemented in the following manner.

The fume collector 62 of the above-described embodiment was a filtration type dust collector that captures fumes with the fume removal filters 63, but the fume collector 62 may be an electric dust collector. The electric dust collector charges fumes in inert gas by corona discharge and captures the fumes by Coulomb force. Moreover, a filter-like catalyst unit is provided to decompose ozone generated by high voltage application by a catalyst. When clogging occurs due to the adhesion of fumes to the catalyst unit along with building, the circulating air volume of inert gas may decrease. Even in such a configuration, by controlling the fume collector 62 to switch the rotation speed of the blower 64 based on the pressure in the chamber 1, it is possible to suppress a decrease in circulating air volume.

Although various embodiments related to the disclosure have been described above, these are presented as examples and are not intended to limit the scope of the disclosure. Such novel embodiments may be implemented in various other forms, and various omissions, replacements, and changes may be made without departing from the spirit of the disclosure. These embodiments and their modifications are included within the scope and spirit of the disclosure and within the scope of the disclosure and its equivalents as set forth in the claims.

What is claimed is:

1. An additive manufacturing apparatus, comprising:

a chamber, an inert gas supply apparatus, a fume collector, a pressure detection apparatus comprising a pressure sensor, and a control apparatus, wherein the chamber covers a building region where a desired three-dimensional object is formed;

the inert gas supply apparatus supplies an inert gas to the chamber;

the fume collector comprises a blower, a filter and a backwash apparatus comprising a pressure accumulating tank, a gas supply path and a gas supply valve provided midway along the gas supply path, wherein one end of the gas supply path is connected to the pressure accumulating tank and the other end of the gas supply path is arranged to face the filter on a downstream side of the filter, and the fume collector removes fumes from the inert gas that is exhausted together with the fumes from the chamber;

the blower circulates the inert gas between the chamber and the fume collector by operating at a predetermined rotation speed;

the filter is configured to be capable of capturing the fumes from the inert gas that is exhausted together with the fumes from the chamber, and the inert gas that is exhausted together with the fumes from the chamber passes through the filter in a predetermined inflow direction; and the backwash apparatus is configured to perform backwash by blowing the inert gas in a direction opposite to the inflow direction onto the filter;

the pressure detection apparatus detects a pressure inside the chamber; and the control apparatus controls the fume collector to switch a rotation speed of the blower based on the pressure.

2. The additive manufacturing apparatus according to claim 1, wherein the fume collector is configured to comprise a fume removal mode and a backwash mode as operating modes, in which in the fume removal mode, the blower is operated to remove the fumes from the inert gas by the filter, and in the backwash mode, the blower is stopped and the backwash is performed by the backwash apparatus;

the control apparatus comprises a mode switching part;

the mode switching part switches between the operating modes; and the control apparatus controls the fume collector in the fume removal mode so as to switch the rotation speed of the blower based on the pressure.

3. The additive manufacturing apparatus according to claim 2, comprising:

a material layer forming apparatus comprising a recoater head and an irradiation apparatus having at least one light source, wherein the material layer forming apparatus forms a material layer by supplying a material powder to the building region;

the irradiation apparatus forms a solidified layer by irradiating the material layer with an energy beam; and the mode switching part switches between the operating modes such that an operation of the fume collector in the backwash mode is performed during formation of the material layer.

4. The additive manufacturing apparatus according to claim 3, wherein the control apparatus comprises a mode continuation time setting part, wherein the mode continuation time setting part sets a removal continuation time, which is a time for one operation of the fume collector in the fume removal mode; and the mode switching part switches from the fume removal mode to the backwash mode based on the removal continuation time.

5. The additive manufacturing apparatus according to claim 4, wherein the mode continuation time setting part sets a first backwash continuation time and a second backwash continuation time, which is longer than the first backwash continuation time, as a backwash continuation time, which is a time for one operation of the fume collector in the backwash mode, wherein the mode switching part switches from the backwash mode to the fume removal mode based on the backwash continuation time;

the first backwash continuation time is the backwash continuation time in an immediately subsequent operation of the fume collector in the backwash mode in a case where the pressure falls within a predetermined allowable range by the control apparatus controlling the fume collector in the fume removal mode; and the second backwash continuation time is the backwash continuation time in an immediately subsequent operation of the fume collector in the backwash mode in a case where the pressure falls below the allowable range, even if the rotation speed of the blower reaches a predetermined upper limit by the control apparatus controlling the fume collector in the fume removal mode.

6. The additive manufacturing apparatus according to claim 4, wherein the mode continuation time setting part sets a first backwash continuation time and a third backwash continuation time, which is longer than the first backwash continuation time, as a backwash continuation time, which is a time for one operation of the fume collector in the backwash mode;

wherein the mode switching part switches from the backwash mode to the fume removal mode based on the backwash continuation time;

the first backwash continuation time is the backwash continuation time in the operation of the fume collector in the backwash mode during a building of the three-dimensional object; and the third backwash continuation time is the backwash continuation time in the operation of the fume collector in the backwash mode between end of the building of the three-dimensional object and start of setup for a subsequent build.

7. The additive manufacturing apparatus according to claim 1, wherein the control apparatus controls the fume collector to increase the rotation speed of the blower when the pressure falls below a predetermined allowable range.

8. The additive manufacturing apparatus according to claim 1, wherein the control apparatus controls the fume collector to decrease the rotation speed of the blower when the pressure exceeds a predetermined allowable range.

9. A method of manufacturing three-dimensional object, forming a desired three-dimensional object by at least covering a building region where the desired three-dimensional object is formed with a chamber and supplying an inert gas to the chamber, while exhausting the inert gas containing fumes from the chamber and removing the fumes contained in the inert gas exhausted from the chamber by a fume collector, wherein the fume collector comprises a blower that circulates the inert gas between the chamber and the fume collector by operating at a predetermined rotation speed, and wherein the method comprises:

a solidified layer forming process of laminating a solidified layer by repeating a material layer forming process of forming a material layer by supplying a material powder to the building region and a solidifying process of forming the solidified layer by irradiating the material layer with an energy beam; and a fume removal process comprising: providing a filter capable of capturing the fumes from the inert gas that is exhausted together with the fumes from the chamber by the blower, and the inert gas that is exhausted together with the fumes from the chamber passes through the filter in a predetermined inflow direction; providing a backwash apparatus to perform backwash by blowing the inert gas in a direction opposite to the inflow direction onto the filter; and switching the rotation speed of the blower of the fume collector based on a pressure in the chamber.

* * * * *